(12) United States Patent
Zhang et al.

(10) Patent No.: US 12,133,187 B2
(45) Date of Patent: Oct. 29, 2024

(54) TIMING ADVANCE COMMAND IMPLEMENTATIONS FOR PRECONFIGURED UPLINK RESOURCE TRANSMISSIONS

(71) Applicant: QUALCOMM Incorporated, San Diego, CA (US)

(72) Inventors: Xiaoxia Zhang, San Diego, CA (US); Alberto Rico Alvarino, San Diego, CA (US); Le Liu, Fremont, CA (US); Lorenzo Ferrari, Oakland, CA (US); Srinivas Yerramalli, Hyderabad (IN); Taesang Yoo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 709 days.

(21) Appl. No.: 17/152,603

(22) Filed: Jan. 19, 2021

(65) Prior Publication Data
US 2021/0235407 A1 Jul. 29, 2021

Related U.S. Application Data

(60) Provisional application No. 62/965,134, filed on Jan. 23, 2020.

(51) Int. Cl.
*H04W 56/00* (2009.01)
*H04W 74/00* (2009.01)
*H04W 74/0833* (2024.01)

(52) U.S. Cl.
CPC ..... *H04W 56/0045* (2013.01); *H04W 74/004* (2013.01); *H04W 74/0833* (2013.01)

(58) Field of Classification Search
CPC .......... H04W 56/0045; H04W 74/004; H04W 74/0833
See application file for complete search history.

(56) References Cited

U.S. PATENT DOCUMENTS

| | | | |
|---|---|---|---|
| 2016/0028533 A1* | 1/2016 | Kazmi | H04W 56/0045 370/296 |
| 2016/0345316 A1* | 11/2016 | Kazmi | H04W 72/21 |
| 2017/0013570 A1* | 1/2017 | Vajapeyam | H04W 74/0833 |
| 2019/0274108 A1* | 9/2019 | O'Shea | H04W 72/0453 |
| 2019/0378018 A1* | 12/2019 | Tokui | G06N 3/044 |
| 2020/0187264 A1* | 6/2020 | Charbit | H04W 74/0833 |
| 2020/0252142 A1* | 8/2020 | Bedekar | H04W 24/10 |

(Continued)

*Primary Examiner* — Redentor Pasia
(74) *Attorney, Agent, or Firm* — Holland & Hart LLP

(57) ABSTRACT

Methods, systems, and devices for wireless communications are described. A user equipment (UE) may be configured with a set of parameters to determine a valid timing advance (TA) to transmit data using preconfigured uplink resources (PUR) during an idle or inactive mode. In some cases, the parameters are one or more TA commands and one or more conditions associated with each TA command. The UE may identify the current condition of the UE and determine whether the current condition of the UE matches one of indicated conditions. The UE may select a TA command based on finding a match and use the TA command to transmit an uplink PUR transmission. Additionally or alternatively, the parameters may be neural network parameters that indicate a neural network model that the UE may use to determine a TA command associated with a valid TA based on the current condition of the UE.

27 Claims, 17 Drawing Sheets

(56) References Cited

U.S. PATENT DOCUMENTS

| | | | |
|---|---|---|---|
| 2021/0037530 A1* | 2/2021 | Shih | H04W 72/046 |
| 2021/0044995 A1* | 2/2021 | Cirkic | H04W 24/08 |
| 2021/0112559 A1* | 4/2021 | Ou | H04W 76/30 |
| 2021/0204192 A1* | 7/2021 | Lee | H04L 67/62 |
| 2021/0274526 A1* | 9/2021 | Shin | H04L 1/1896 |
| 2021/0306968 A1* | 9/2021 | Liberg | H04B 17/318 |
| 2022/0007391 A1* | 1/2022 | Höglund | H04W 72/21 |
| 2022/0078739 A1* | 3/2022 | Zhang | H04W 56/0045 |
| 2022/0116881 A1* | 4/2022 | Shin | H04W 52/48 |
| 2022/0394519 A1* | 12/2022 | Thangarasa | H04L 43/16 |

\* cited by examiner ized Fourier transform spread orthogonal frequency division multiplexing (DFT-S-OFDM) with a focus on wireless communications and timing advance topics.

TIMING ADVANCE COMMAND IMPLEMENTATIONS FOR PRECONFIGURED UPLINK RESOURCE TRANSMISSIONS

CROSS REFERENCE

The present Application for Patent claims the benefit of U.S. Provisional Patent Application No. 62/965,134 by ZHANG et al., entitled "TIMING ADVANCE COMMAND IMPLEMENTATIONS FOR PRECONFIGURED UPLINK RESOURCE TRANSMISSIONS," filed Jan. 23, 2020, assigned to the assignee hereof, and expressly incorporated by reference herein.

FIELD OF TECHNOLOGY

The following relates generally to wireless communications and more specifically to timing advance (TA) command implementations for preconfigured uplink resource (PUR) transmissions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a base station may configure a UE to transmit an uplink transmission in preconfigured uplink resources (PUR) if the UE has a valid timing advance (TA). In some cases, the UE may not have a valid TA and may instead transmit the uplink transmission in an early data transmission (EDT) without using PUR. In some implementations, an uplink transmission using PUR may be transmitted in message 1 (msg1) of a random access channel (RACH) procedure and an uplink EDT may be transmitted in message 3 (msg3) of a RACH procedure. As such, an uplink EDT may incur more power consumption and increase transmission delay because more RACH messages and time may be needed for an EDT than for a PUR transmission.

SUMMARY

The described techniques relate to improved methods, systems, devices, and apparatuses that support timing advance (TA) command implementations for preconfigured uplink resource (PUR) transmissions. Generally, the described techniques provide for mitigating power consumption and transmission delay. To achieve such improvements, a base station may provide more opportunities to a user equipment (UE) to use PUR in message 1 (msg1) or message A (msgA) of a random access channel (RACH) procedure. In some cases, the base station may configure a UE with one or more TA commands each associated with one or more conditions. For example, the base station may transmit one or more TA commands and one or more conditions to the UE, where each TA command may have a corresponding set of conditions. The UE may identify the current condition of the UE and determine whether the current condition of the UE matches one of the sets of conditions indicated by the base station. The UE may select a TA command based on finding a match and apply the valid TA of the TA command to transmit an uplink transmission using PUR. Additionally or alternatively, the base station may transmit a set of neural network parameters to the UE that indicate a neural network model. The UE may use the neural network model to determine a TA command associated with a valid TA based on the current condition of the UE.

A method of wireless communications at a UE is described. The method may include receiving, from a base station, a message that includes one or more parameters for determination of a TA command from a set of TA commands, determining the TA command based on the one or more parameters and a current condition of the UE, and applying the TA command to an uplink transmission whose sending is based on the UE having a valid TA command.

An apparatus for wireless communications at a UE is described. The apparatus may include a processor, memory coupled with the processor, and instructions stored in the memory. The instructions may be executable by the processor to cause the apparatus to receive, from a base station, a message that includes one or more parameters for determination of a TA command from a set of TA commands, determine the TA command based on the one or more parameters and a current condition of the UE, and apply the TA command to an uplink transmission whose sending is based on the UE having a valid TA command.

Another apparatus for wireless communications at a UE is described. The apparatus may include means for receiving, from a base station, a message that includes one or more parameters for determination of a TA command from a set of TA commands, determining the TA command based on the one or more parameters and a current condition of the UE, and applying the TA command to an uplink transmission whose sending is based on the UE having a valid TA command.

A non-transitory computer-readable medium storing code for wireless communications at a UE is described. The code may include instructions executable by a processor to receive, from a base station, a message that includes one or more parameters for determination of a TA command from a set of TA commands, determine the TA command based on the one or more parameters and a current condition of the UE, and apply the TA command to an uplink transmission whose sending is based on the UE having a valid TA command.

Some examples of the method, apparatuses, and non-transitory computer-readable medium described herein may further include operations, features, means, or instructions for determining the TA command includes determining an availability of the TA command to be applied to the uplink transmission based on the current condition of the UE.

Some examples of the method, apparatuses, and non-transitory computer-readable medium described herein may further include operations, features, means, or instructions for determining the availability of the TA command is performed when the UE is in an idle or inactive mode with respect to the base station, and where the message is received when the UE is in a connected mode with respect to the base station.

In some examples of the method, apparatuses, and non-transitory computer-readable medium described herein, the uplink transmission is an uplink signal or uplink channel transmitted on PUR based on a PUR configuration.

In some examples of the method, apparatuses, and non-transitory computer-readable medium described herein, the uplink transmission is a msgA transmission including a small data transmission, where the msgA transmission is associated with a 2-step random access procedure, and where the msgA transmission is transmitted using PUR when the TA command is available.

In some examples of the method, apparatuses, and non-transitory computer-readable medium described herein, the UE avoiding transmitting the uplink transmission in an absence of the TA command may include operations, features, means, or instructions for preparing a msg3 transmission including a small data transmission in connection with a four-step random access procedure, and transmitting the msg3 transmission to a target base station based on a timing determined from the four-step random access procedure.

In some examples of the method, apparatuses, and non-transitory computer-readable medium described herein, receiving the message that includes the one or more parameters for determination of the TA command may include operations, features, means, or instructions for receiving a set of sets of parameters, each set of parameters including a set of conditions pertaining to a corresponding TA command of the set of TA commands.

In some examples of the method, apparatuses, and non-transitory computer-readable medium described herein, determining the TA command further may include operations, features, means, or instructions for comparing the current condition of the UE with one or more of the sets of conditions, where each set of conditions includes a first reference signal received power (RSRP) range associated with a serving base station, a second RSRP range associated with one or more neighboring base stations, or a combination thereof, and selecting the TA command based on the set of conditions that includes the current condition of the UE.

In some examples of the method, apparatuses, and non-transitory computer-readable medium described herein, determining the TA command further may include operations, features, means, or instructions for comparing the current condition of the UE with one or more of the sets of conditions, where each set of conditions includes a relative delay range between a serving base station and one or more neighboring base stations, and selecting the TA command based on the set of conditions that includes the current condition of the UE.

In some examples of the method, apparatuses, and non-transitory computer-readable medium described herein, determining the TA command further may include operations, features, means, or instructions for comparing the current condition of the UE with one or more of the sets of conditions, where each set of conditions includes a positional range of the UE, and selecting the TA command based on the set of conditions that includes the current condition of the UE.

In some examples of the method, apparatuses, and non-transitory computer-readable medium described herein, receiving the message that includes the one or more parameters for determination of the TA command may include operations, features, means, or instructions for receiving a neural network model for determination of the TA command, where the one or more parameters may be neural network model parameters.

In some examples of the method, apparatuses, and non-transitory computer-readable medium described herein may further include operations, features, means, or instructions for using the current condition of the UE as an input to the neural network model, and determining the TA command based on an output of the neural network model.

In some examples of the method, apparatuses, and non-transitory computer-readable medium described herein, the current condition of the UE may be a RSRP range associated with a serving base station, a second RSRP range associated with one or more neighboring base stations, or a combination thereof.

In some examples of the method, apparatuses, and non-transitory computer-readable medium described herein, the current condition of the UE may be a relative delay range between a serving base station and one or more neighboring base stations.

In some examples of the method, apparatuses, and non-transitory computer-readable medium described herein, the current condition of the UE may be a positional range of the UE.

In some examples of the method, apparatuses, and non-transitory computer-readable medium described herein, the uplink transmission may be a PUR transmission.

In some examples of the method, apparatuses, and non-transitory computer-readable medium described herein, the uplink transmission may be a msgA transmission including a small data transmission transmitted using PUR, and where the msgA is associated with a 2-step random access procedure.

In some examples of the method, apparatuses, and non-transitory computer-readable medium described herein, determining the TA command may include operations, features, means, or instructions for determining the TA command while the UE may be not in an active connected mode.

Some examples of the method, apparatuses, and non-transitory computer-readable medium described herein may further include operations, features, means, or instructions for transmitting a parameter update to the base station, and receiving a new set of parameters for determination of the TA command, the new set of parameters based on the parameter update.

In some examples of the method, apparatuses, and non-transitory computer-readable medium described herein, the parameter update may be included in the uplink transmission.

In some examples of the method, apparatuses, and non-transitory computer-readable medium described herein, the parameter update includes an update regarding a neural network model.

A method of wireless communications at a base station is described. The method may include configuring one or more parameters associated with a set of TA commands and transmitting, to a UE, a message that includes the one or more parameters for determination of a TA command from the set of TA commands.

An apparatus for wireless communications at a base station is described. The apparatus may include a processor, memory coupled with the processor, and instructions stored in the memory. The instructions may be executable by the processor to cause the apparatus to configure one or more parameters associated with a set of TA commands and transmit, to a UE, a message that includes the one or more parameters for determination of a TA command from the set of TA commands.

Another apparatus for wireless communications at a base station is described. The apparatus may include means for configuring one or more parameters associated with a set of TA commands and transmitting, to a UE, a message that includes the one or more parameters for determination of a TA command from the set of TA commands.

A non-transitory computer-readable medium storing code for wireless communications at a base station is described. The code may include instructions executable by a processor to configure one or more parameters associated with a set of TA commands and transmit, to a UE, a message that includes the one or more parameters for determination of a TA command from the set of TA commands.

In some examples of the method, apparatuses, and non-transitory computer-readable medium described herein, transmitting the message that includes one or more parameters for determination of the TA command may include operations, features, means, or instructions for transmitting a set of sets of parameters, each set of parameters including a set of conditions pertaining to a corresponding TA command of the set of TA commands.

In some examples of the method, apparatuses, and non-transitory computer-readable medium described herein, each set of conditions includes a first RSRP range associated with a serving base station, a second RSRP range associated with one or more neighboring base stations, or a combination thereof.

In some examples of the method, apparatuses, and non-transitory computer-readable medium described herein, each set of conditions includes a relative delay range between a serving base station and one or more neighboring base stations.

In some examples of the method, apparatuses, and non-transitory computer-readable medium described herein, each set of conditions includes a positional range of the UE.

In some examples of the method, apparatuses, and non-transitory computer-readable medium described herein, transmitting the message that includes one or more parameters for determination of the TA command further may include operations, features, means, or instructions for transmitting a neural network model for determination of the TA command, where the one or more parameters may be neural network model parameters.

Some examples of the method, apparatuses, and non-transitory computer-readable medium described herein may further include operations, features, means, or instructions for receiving an uplink transmission whose sending may be based on the UE having a valid TA command, where the uplink transmission may be a PUR transmission.

Some examples of the method, apparatuses, and non-transitory computer-readable medium described herein may further include operations, features, means, or instructions for receiving, from the UE, a parameter update, determining a new set of parameters based on the parameter update, and transmitting, to the UE, the new set of parameters for determination of the TA command.

In some examples of the method, apparatuses, and non-transitory computer-readable medium described herein, the parameter update may be included in an autonomously-scheduled uplink transmission.

In some examples of the method, apparatuses, and non-transitory computer-readable medium described herein, the parameter update includes an update regarding a neural network model.

DETAILED DESCRIPTION

Figure 1:
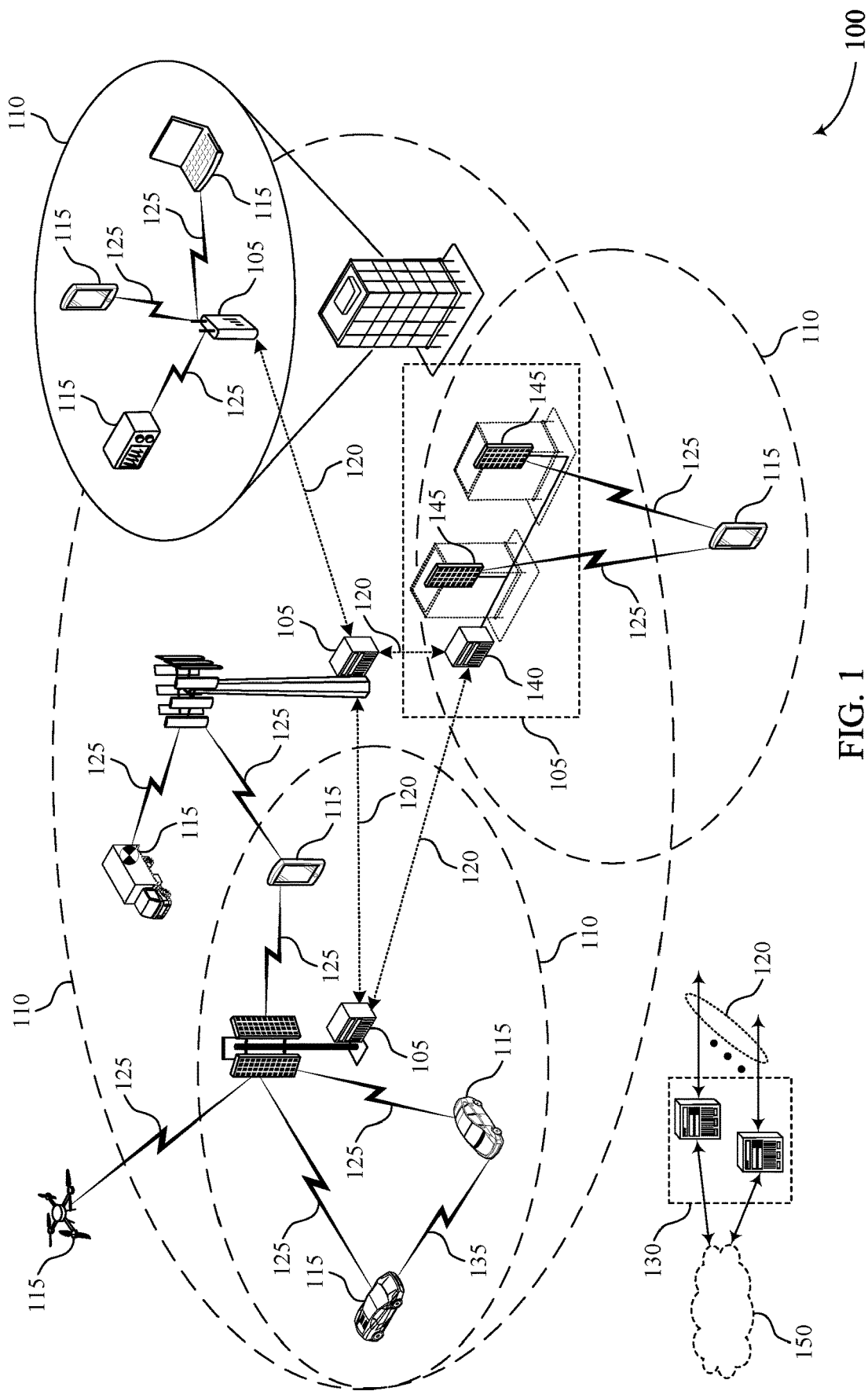
FIGS. 1 through 4 illustrate an example of a system for wireless communications that supports timing advance (TA) command implementations for preconfigured uplink resource (PUR) transmissions in accordance with aspects of the present disclosure.

In some wireless communications systems, a user equipment (UE) may receive a timing advance (TA) command and an associated condition from a base station prior to the UE entering an idle mode (e.g., an inactive mode, a non-connected mode, anon-active mode, any mode outside of a connected state). The base station may also indicate preconfigured uplink resources (PUR) to the UE that the UE may use in idle mode for autonomously-scheduled uplink transmissions, such as a grant-free uplink transmission to transmit a small amount of data. The UE may use the PUR for an uplink transmission in an idle mode if the UE has a valid TA. In idle mode and prior to transmitting with PUR, the UE (e.g., a UE in radio resource control (RRC)_IDLE mode) may determine whether the UE has a valid TA based on the conditions associated with the configured TA command. In some cases, the conditions may be a reference signal received power (RSRP) change, or timer value, or a combination thereof. For example, the UE may determine an RSRP change associated with a serving base station. If the RSRP change is within a preconfigured threshold, the UE may consider the TA to be valid. In other examples, the UE may consider a timer and if the timer is within a preconfigured threshold, the UE may consider the TA to be valid.

In some cases, the UE may determine the TA to be valid, and may transmit an uplink PUR transmission in an idle mode. In some cases, the UE may determine that the TA is not valid and may instead transmit uplink data in an early data transmission (EDT) in an idle mode without using PUR. In some implementations, an uplink PUR transmission may be transmitted in message 1 (msg1) or message A (msgA) of a random access channel (RACH) procedure and an uplink EDT may be transmitted in message 3 (msg3) of a RACH procedure. As such, an uplink EDT may incur more power consumption and increase transmission delay, compared to an uplink transmission with PUR, because a transmission at msg3 of the RACH procedure would have two RACH messages being transmitted or received prior to the msg3.

To reduce power consumption and delay for small data transmissions in idle mode while mitigating overhead, a base station may configure a UE with more opportunities to utilize PUR for an uplink transmission by increasing the likelihood that the TA is valid. In some cases, the base station may configure a UE with one or more TA commands each associated with one or more conditions. For example, the base station may transmit one or more TA commands and one or more conditions to the UE, where each TA command may have a corresponding set of conditions. The UE may identify the current condition of the UE and determine whether the current condition of the UE matches one of the sets of conditions indicated by the base station. The UE may select a TA command based on finding a match and apply the valid TA of the TA command to transmit an uplink PUR transmission. Additionally or alternatively, the base station may transmit neural network parameters to the UE that indicate a neural network model. The UE may use the neural network model to determine a TA command associated with a valid TA based on the current condition of the UE.

Particular implementations of the subject matter described in this disclosure may be implemented to realize one or more potential advantages. In some implementations, the described techniques can be used to reduce power consumption and transmission delay for small data transmissions for a UE in idle mode. For example, configuring a UE with multiple TA commands, each associated with one or more conditions, or configuring a UE with a neural network model to determine a TA command based on the current condition of the UE may enable the UE to more frequently have a valid TA and be able to transmit uplink PUR transmissions rather than EDT. As an uplink PUR transmission is transmitted in a msg1 or msgA of a RACH procedure and an uplink EDT is transmitted in msg3 of a RACH procedure, the PUR transmission may use less resources, and mitigate transmission delay as compared to an EDT.

Aspects of the disclosure are initially described in the context of wireless communications systems. Aspects are then described with respect to a process flow. Aspects of the disclosure are further illustrated by and described with reference to apparatus diagrams, system diagrams, and flowcharts that relate to TA command implementations for PUR transmissions.

FIG. 1 illustrates an example of a wireless communications system 100 that supports TA command implementations for PUR transmissions in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

To mitigate power consumption and transmission delay associated with a UE transmitting uplink data transmissions in idle mode, a UE may be configured to more frequently have a valid TA to allow the UE to transmit using PUR. In some cases, a base station may configure a UE with one or more TA commands and one or more conditions associated with each TA command. For example, the base station may transmit one or more TA commands and one or more conditions to the UE, where each TA command may have a corresponding set of conditions. The UE may identify the current condition of the UE and determine whether the current condition of the UE matches one of the sets of conditions indicated by the base station. The UE may select a TA command based on finding a match and apply the valid TA of the TA command to transmit an uplink PUR transmission. Additionally or alternatively, the base station may transmit neural network parameters to the UE that indicate a neural network model. The UE may use the neural network model to determine a TA command associated with a valid TA based on the current condition of the UE.

Figure 2:
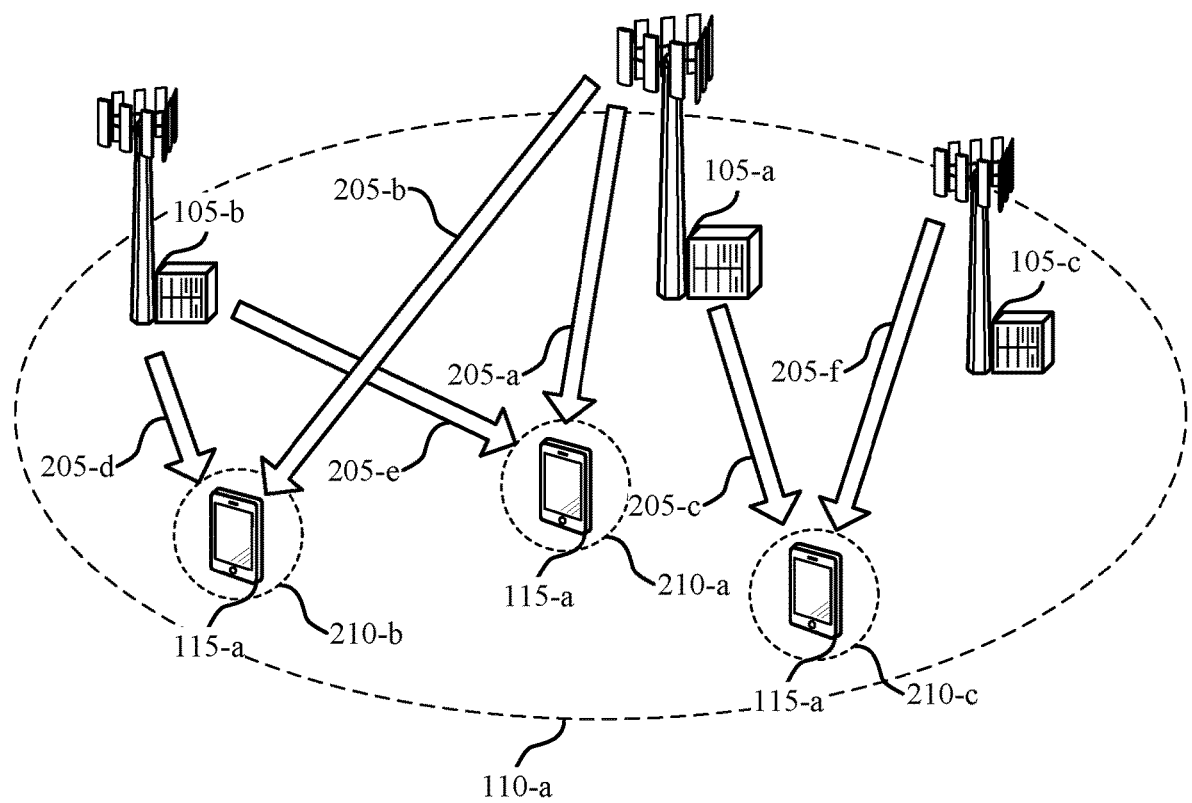

FIG. 2 illustrates an example of a wireless communications system 200 that supports TA command implementations for PUR transmissions in accordance with aspects of the present disclosure. The wireless communications system 200 may include base stations 105-a, 105-b, and 105-c, and UE 115-a, which may be examples of base stations 105 and a UE 115 as described with reference to FIG. 1. Base station 105-a may serve a geographic coverage area 110-a. In some cases, base station 105-a may configure UE 115-a with enhanced TA command procedures. For example, base station 105-a may transmit one or more parameters to UE 115-a that may allow UE 115-a to select a valid TA. Additionally or alternatively, other wireless devices, such as base stations 105-b, or 105-c, or UE 115-a, or some combination of these devices, may implement an enhanced TA command procedure to mitigate power consumption and transmission delay associated with an uplink data transmission transmitted by a UE 115 in idle mode.

In some wireless communications systems, such as wireless communications system 200, a UE 115 (e.g., UE 115-a) may communicate with a serving base station 105 (e.g., serving base station 105-a) and one or more neighboring base stations 105 (e.g., base stations 105-b and 105-c). UE 115-a may move around a cell which may impact which base station 105 the UE 115 may communicate with. For example, UE 115-a may move to position 115-a and serving base station 105-a may communicate with UE 115-a via downlink 205-a, and base station 105-b may communicate with UE 115-a via downlink 205-e. If UE 115-a moves to position 210-b, serving base station 105-a may communicate with UE 115-a via downlink 205-b, and base station 105-b may communicate with UE 115-a via downlink 205-d. If UE 115-a moves to position 210-c, serving base station 105-a may communicate with UE 115-a via downlink 205-c, and base station 105-c may communicate with UE 115-a via downlink 205-f.

In some implementations, a UE 115 may receive a TA command and one or more conditions from a base station 105 (e.g., serving base station 105-a) while the UE 115 is in a connected mode. The TA command may indicate a TA value that the UE may use for transmissions in the connected mode and transmissions in a non-connected mode (e.g., an idle mode), where the received conditions may indicate under what conditions the TA is valid. A TA may provide an offset that indicates a duration between a received downlink transmission and a transmitted uplink transmission at the UE 115 to ensure that the downlink and uplink transmissions are synchronized at the serving base station 105. The TA may be based on a UEs 115 distance from the serving base station 105 (e.g., serving base station 105-a) because the farther a UE 115 is from serving base station 105-a, the larger the propagation delay. As such, the TA for a UE 115 may be determined based on offsetting the propagation delay of a UE 115, where the larger the propagation delay is, the larger the TA is.

In some cases, a mobile UE 115 may move to a position where the last TA the UE 115 was configured with is no longer valid because the UE 115 moved. For example, UE 115-a may move from a first position 210-a to a second position 210-b, or a third position 210-c, or a combination thereof. In some cases, each position 210 may be best served by a different TA. As such, if UE 115-a moves from the first position 210-a to a different position 210, the TA UE 115-a has been configured with may be invalid. To determine whether the TA is still valid, the UE 115 may determine the current condition of the UE and determine whether the current condition matches the condition associated with the configured TA command. In some cases, the conditions include a threshold for a change in RSRP related to a serving base station 105, or a threshold for a timer value, or a combination thereof. For example, a UE 115 may determine whether an RSRP change associated with the serving base station 105 is within a threshold, or determine whether a timer is within a threshold, or a combination thereof. If the RSRP change or timer is within a preconfigured threshold, the UE 115 may determine that the TA is valid. If the RSRP change or timer is not within a preconfigured threshold, the UE 115 may determine that the TA is invalid.

In some cases, a base station 105 may configure a UE 115 with PUR that a UE 115 may use to transmit autonomously-scheduled uplink transmissions in an idle mode. The UE 115 may use the PUR to transmit an uplink transmission in an idle mode if the UE 115 has a valid TA. The PUR may be configured as a physical uplink channel or as a signal transmitted on the PUR such as a physical uplink shared channel (PUSCH) or as msgA of a RACH procedure or any other uplink signal, where the UE 115 may transmit the uplink signal or transmission directly in the PUSCH, msgA, or the PUR. When PUR is configured as PUSCH resources, if the UE 115 does not have a valid TA, the UE may instead transmit an uplink EDT. An EDT may be configured in msg3 of a RACH procedure. As such, when transmitting an EDT in msg3, the UE 115 may first transmit RACH preamble in msg1 to a base station 105. The UE may wait for the base station 105 to respond with a RACH msg 2, and then the UE 115 may transmit the uplink transmission in the EDT in RACH msg3. As such, an EDT may use more overhead and resources than a PUR transmission. When PUR is configured as msgA resources, if the UE 115 does not have a valid TA, the msgA transmission from multiple UEs 115 may correspond to different receiver timings at base station 105 reception. This may cause potential interference on adjacent sub-carriers, or resource blocks, or a combination thereof which may reduce receive signal quality at a base station 105 or it may reduce network efficiency by allocating guard sub-carriers, or resource blocks, or a combination thereof to deal with the interference on adjacent sub-carriers, or resource blocks, or a combination thereof. In addition, a base station 105 may apply different receiver timings for different UEs 115, which may cause additional implementation complexity as a base station 105 may not be able to perform a single fast Fourier transform (FFT) to process multiple UEs 115 with different timing offsets.

To mitigate the higher power consumption and transmission delay associated with an EDT, as compared to a PUR transmission, a base station 105 may configure a UE 115 with more opportunities to use PUR by increasing the likelihood that the UE 115 has a valid TA. In some cases, the base station 105 may configure a UE 115 with one or more TA commands each associated with one or more enhanced conditions. For example, the base station 105 may transmit one or more TA commands and one or more conditions to the UE, where each TA command may have a corresponding set of conditions. The UE may identify the current condition of the UE and determine whether the current condition of the UE matches one of the sets of conditions indicated by the base station. The UE may select a TA command based on finding a match and apply the valid TA of the TA command to transmit an uplink PUR transmission. In some cases, the conditions may be based on the position of the UE 115 relative to serving base station 105-a, or one or more neighboring base stations (e.g., base stations 105-b and 105-c), or a combination thereof. In some cases, the conditions may include an RSRP associated with one or more base stations 105, the relative delay between a UE 115 and one or more base stations 105, or the position of the UE 115 within the cell, or a combination thereof. Additionally or alternatively, the serving base station 105 may transmit neural network parameters to the UE 115 that indicate a neural network model. The UE 115 may use the neural network model to determine a TA command associated with a valid TA based on the current condition of the UE.

Figure 3:
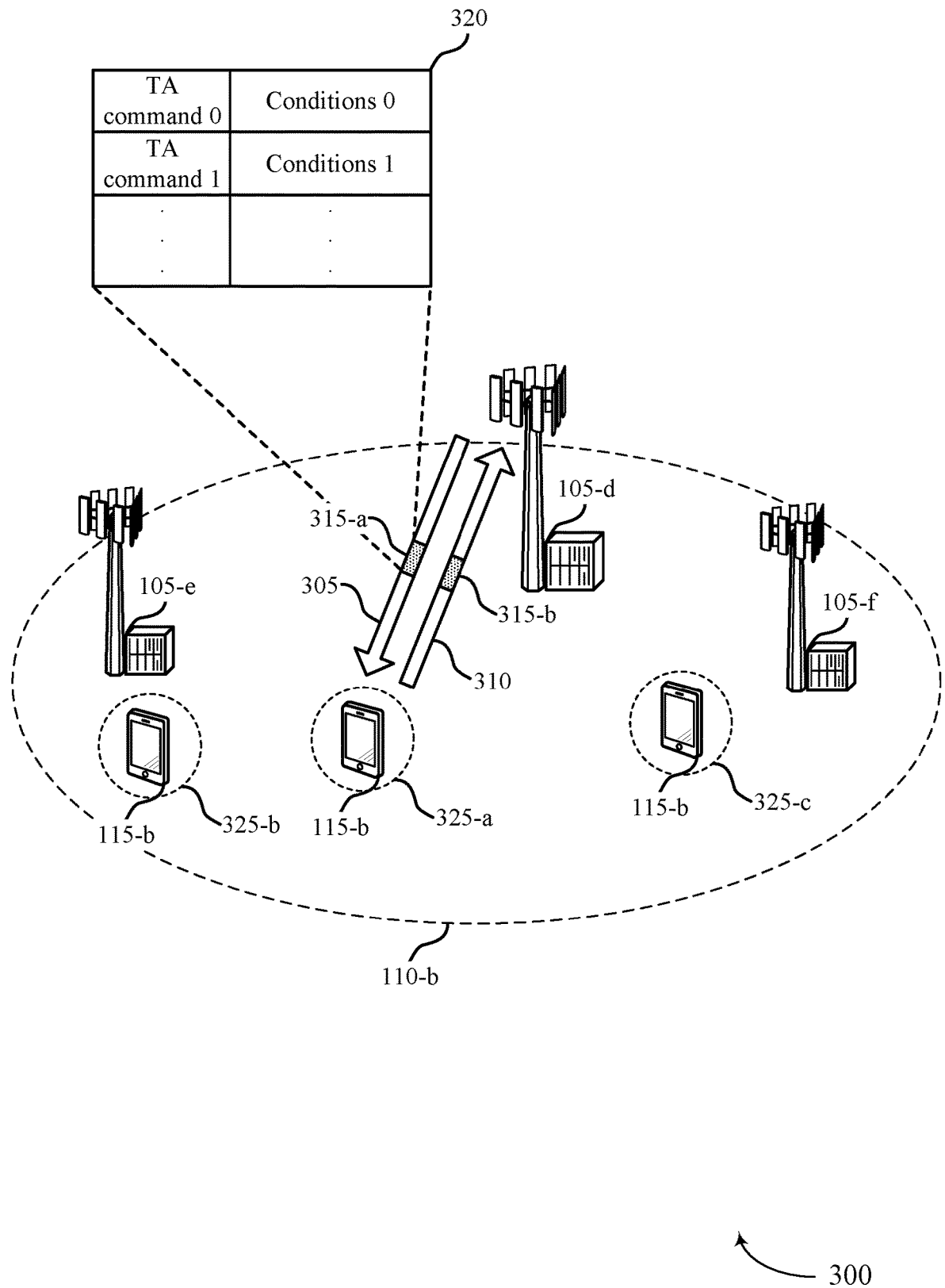

FIG. 3 illustrates an example of a wireless communications system 300 that supports TA command implementations for PUR transmissions in accordance with aspects of the present disclosure. The wireless communications system 300 may include base stations 105-d, 105-e, and 105-f, and a UE 115-b, which may be examples of base stations 105 and a UE 115 as described with reference to FIGS. 1 and 2. Base station 105-d may serve a geographic coverage area 110-b. In some cases, base station 105-d may configure UE 115-b with enhanced TA command procedures. For example, base station 105-d may transmit one or more parameters to UE 115-b that may allow UE 115-b to select a valid TA. Additionally or alternatively, other wireless devices, such as base stations 105-e, or 105-f, or UE 115-b, or some combination of these devices, may implement an enhanced TA command procedure to mitigate power consumption and transmission delay associated with an uplink data transmission transmitted by a UE 115 in idle mode.

As described with reference to FIG. 2, a serving base station 105 may configure a UE 115 with one or more TA commands, where each TA command may be associated with a corresponding set of conditions. In some cases, as described with reference to FIG. 2, the set of conditions may be based on the position of a UE 115 within a cell. For example, an RSRP, relative delay value, or positional range of the UE 115 may indicate the position of a UE 115 in relation to one or more base stations 105 or indicate the position of the UE 115 within a cell, such as positions 325-a, 325-b, and 325-c.

In some cases, the conditions may include an RSRP threshold of a serving base station 105-d and an RSRP threshold of one or more neighboring base stations 105 (e.g., neighboring base stations 105-e, and 105-f). For example, a first TA command (e.g., TA command 0) may be associated with a first RSRP range for a serving base station 105-d (e.g., [X00, Y00]) and a second RSRP range for one or more neighboring base stations 105 (e.g., [X01, Y01]). The first and second RSRP ranges may be the same or different. In another example, a second TA command (e.g., TA command 1) may be associated with a third RSRP range for serving base station 105-d (e.g., [X10, Y10]) and a fourth RSRP range for one or more neighboring base stations 105 (e.g., X11, Y11]). The third and fourth ranges may be the same or different and may be the same or different from the first and second RSRP ranges.

Additionally or alternatively, the condition may be a relative delay between a serving base station 105-d and a neighboring base station 105. For example, a first TA command (e.g., TA command 0) may be associated with a first relative delay range between a serving base station 105-d and a neighboring base station 105 (e.g., [0, T0]). In another example, a second TA command (e.g., TA command 1) may be associated with a second relative delay range between a serving base station 105-d and a neighboring base station 105 (e.g., [T0, T1]). The neighboring base stations 105 associated with the first and second TA commands may be the same or different. Additionally or alternatively, the condition may be a positional range of the UE 115. In some cases, the position of the UE 115 may be expressed based on the position of the UE 115 within a cell, such as positions 325-a, 325-b, or 325-c, or may be expressed based on the position on the UEs position in relation to one or more base stations 105, or a combination thereof. In some cases, a first TA command (e.g., TA command 0) may be associated with a first positional range (e.g., positioning range 0) and a second TA command (e.g., TA command 1) may be associated with a second positional range (e.g., positioning range 1).

In some implementations, UE 115-b may receive a downlink communications signal 305 carrying message 315-a while UE 115-b is in a connected mode. Message 315-a may include a preconfigured table 320 that includes one or more TA commands (e.g., TA command 0 and TA command 1) and one or more sets of conditions associated with each TA command (e.g., conditions 0 and conditions 1), where the conditions may include an RSRP range of one or more base stations 105, relative delay range between base stations 105, or a positional range of a UE 115, or a combination thereof. Serving base station 105-d may configure the table based on the trajectory of UE 115-b. For example, serving base station 105-d may configure table 320 such that the table 320 accounts for possible conditions UE 115-b may encounter based on the current trajectory of the UE 115. Sometime after receiving message 315-a, UE 115-a may switch to a non-connected mode such as an idle or inactive mode. Upon receiving the table 320 or some other indicator of the set of TA commands and associated conditions, UE 115-b may determine the current condition of UE 115-b. For example, UE 115-b may determine the RSRP of the serving base station 105-d and one or more neighboring base stations 105, or the relative delay between serving base station 105-d and another base station 105, or the position of UE 115-b, or a combination thereof.

UE 115-b may look through the table 320 and determine whether one of the sets of conditions indicated in the table matches the current condition of UE 115-b. If UE 115-b determines there is a match, then the UE may select the TA command associated with the set of conditions that matches the current condition of UE 115-b. The selected TA command may configure UE 115-b with a valid TA that UE 115-b may use to transmit a small uplink data transmission 315-b using PUR via uplink communications signal 310 to serving base station 105-d.

Figure 4:
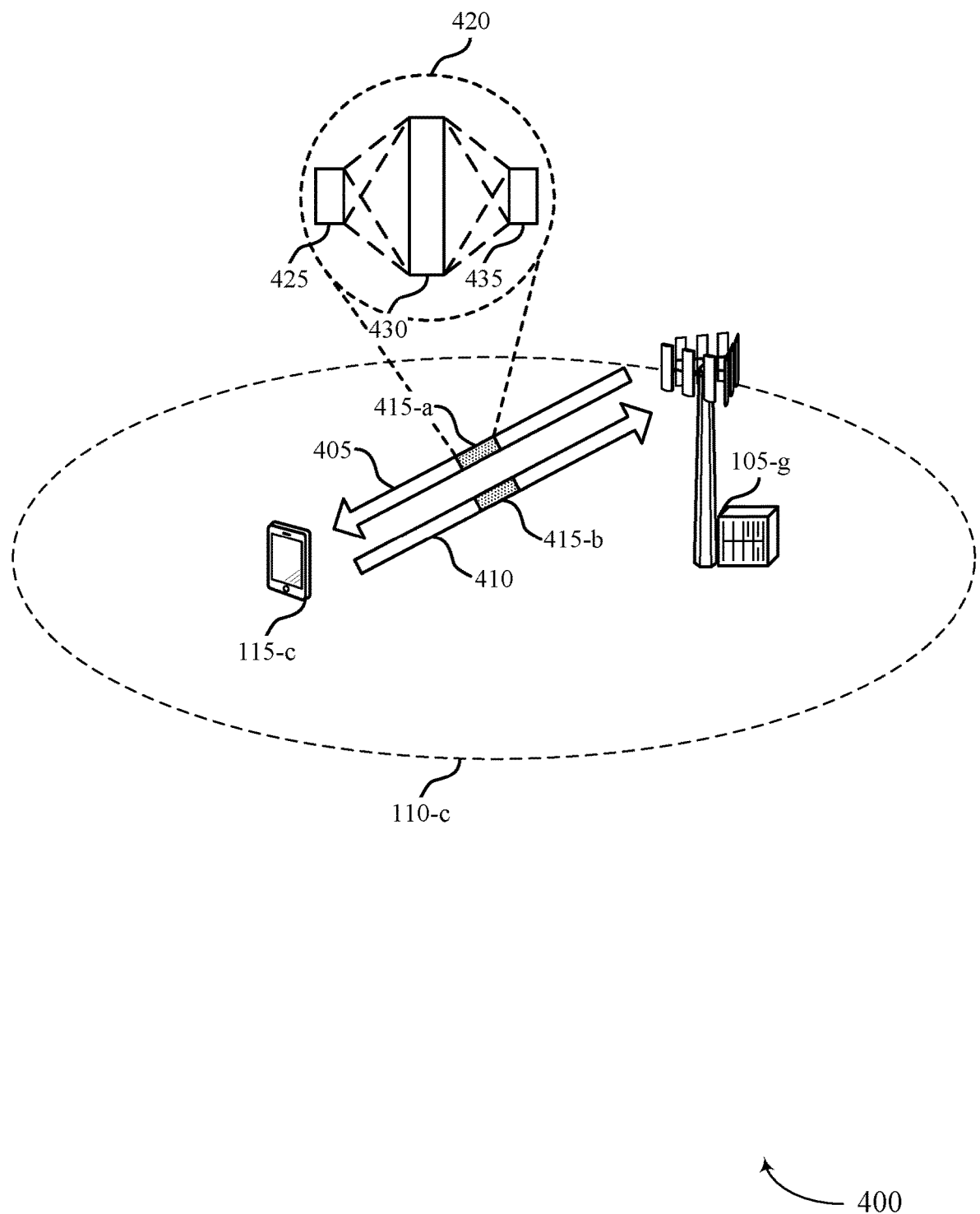

FIG. 4 illustrates an example of a wireless communications system 400 that supports TA command implementations for PUR transmissions in accordance with aspects of the present disclosure. The wireless communications system 400 may include base station 105-g and UE 115-c, which may be examples of a base station 105 and a UE 115 as described with reference to FIGS. 1 through 3. Base station 105-g may serve a geographic coverage area 110-c. In some cases, base station 105-g may configure UE 115-c with enhanced TA command procedures. For example, base station 105-g may transmit one or more parameters to UE 115-c that may allow UE 115-c to select a valid TA. Additionally or alternatively, other wireless devices, such as UE 115-c may implement an enhanced TA command procedure to mitigate power consumption and transmission delay associated with an uplink data transmission transmitted by a UE 115 in idle mode.

In some implementations, serving base station 105-g may transmit one or more neural network parameters in message 415-a via downlink transmission 405 to UE 115-c. The neural network parameters may indicate a neural network model 420 that UE 115-c may use to determine a valid TA based on the current condition of the UE 115-a. The neural network model 420 may utilize machine-learning to determine a TA command for a current condition of UE 115-c. For example, the neural network model may be a function of the current condition of UE 115-c (e.g., TA=f(x), where x is the current condition of UE 115-c). In some cases, the neural network model 420 may include an input 425, a hidden layer 430, and an output 435. The input 425 of the neural network model 420 may be the current condition of UE 115-c that may be fed to the hidden layer 430. The hidden layer 430 of the neural network may be comprised of the parameters provided by serving base station 105-g. The hidden layer 430 may be in between input and output layers where artificial neurons consider a set of weighted inputs and produce an output through an activation function, such as the function described herein (e.g., TA=f(x)). The neural network model 420 may determine a valid TA based on the current condition of UE 115-c and output the TA command associated with the appropriate TA at the output 435 of the neural network model 420. UE 115-c may apply the TA value associated with the outputted TA command to uplink transmission 410 to transmit a small data transmission message 415-b using PUR. In some cases, configuring a UE 115 with a neural network model may reduce overhead.

In some cases, UE 115-c may include a suggested update to the neural network model 420 in small data transmission message 415-b based on the current condition of UE 115-c. Additionally or alternatively, UE 115-c may include a request for updated neural network parameters in small data transmission message 415-b. In some cases, base station 105-g may update the neural network parameters based on a request from UE 115-c, the suggested updated from UE 115-c, or based on the small data transmission received from UE 115-c, or a combination thereof. In some cases, UE 115-c may enter into a connected state with base station 105-g and UE 115-c and base station 105-g may exchange information relating to updating the neural network model.

Figure 5:
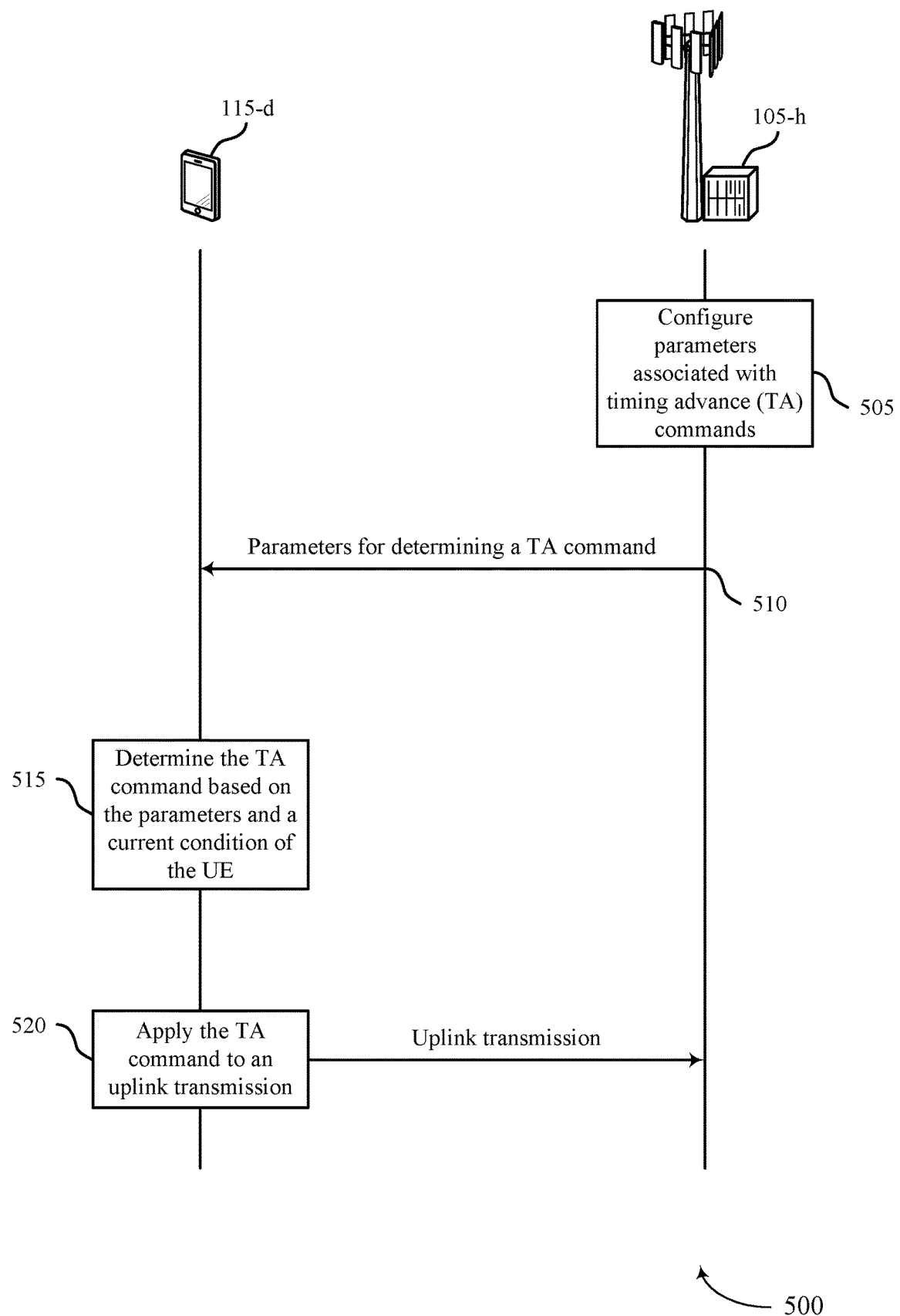
FIG. 5 illustrates an example of a process flow that supports TA command implementations for PUR transmissions in accordance with aspects of the present disclosure.

FIG. 5 illustrates an example of a process flow 500 that supports TA command implementations for PUR transmissions in accordance with aspects of the present disclosure. The process flow 500 may illustrate an example TA command scheme. For example, base station 105-h may transmit one or more parameters to UE 115-d for determining a valid TA command. In some cases, base station 105-h may be a serving base station 105. Base station 105-h and UE 115-d may be examples of the corresponding wireless devices described with reference to FIGS. 1 through 4. In some cases, instead of base station 105-h implementing the TA scheme, a different type of wireless device (e.g., a UE 115) may determine the TA scheme. Alternative examples of the following may be implemented, where some steps are performed in a different order than described or are not performed at all. In some cases, steps may include additional features not mentioned below, or further steps may be added.

At 505, base station 105-h may configure one or more parameters associated with a set of TA commands. At 510, UE 115-d may receive, from base station 105-h, a message that includes one or more parameters for determination of a TA command from a plurality of TA commands. In some cases, UE 115-d may receive a plurality of sets of parameters, each set of parameters including a set of conditions pertaining to a corresponding TA command of the plurality of TA commands. In some cases, UE 115-d may receive a neural network model for determination of the TA command, where the one or more parameters are neural network model parameters.

At 515, UE 115-d may determine the TA command based on the one or more parameters and a current condition of UE 115-d. In some cases, UE 115-d may determine the availability of the TA command based on the one or more parameters and a current condition of 115-d. For example, determining the TA command may include determining an availability of the TA command to be applied to the uplink transmission based on the current condition of UE 115-d. In some cases, as part of determining the TA command or the availability of the TA command, UE 115-d may compare the current condition of UE 115-d with one or more of the sets of conditions, where each set of conditions includes a first RSRP range associated with a serving base station 105, a second RSRP range associated with one or more neighboring base stations 105, or a combination thereof. In some cases, UE 115-d may compare the current condition of UE 115-d with one or more of the sets of conditions, where each set of conditions includes a relative delay range between a serving base station 105 and one or more neighboring base stations 105. In some cases, UE 115-d may compare the current condition of UE 115-d with one or more of the sets of conditions, where each set of conditions includes a positional range of UE 115-d. In some cases, UE 115-d may select the TA command based on the set of conditions that includes the current condition of UE 115-d.

In some implementations, as part of determining the TA command or the availability of the TA command, UE 115-d may use the current condition of UE 115-d as an input to the neural network model and determine the TA command based on an output of the neural network model. In some cases, the current condition of UE 115-d is an RSRP range associated with a serving base station 105, a second RSRP range associated with one or more neighboring base stations 105, or a combination thereof. In some cases, the current condition of UE 115-d is a relative delay range between a serving base station 105 and one or more neighboring base stations 105. In some cases, the current condition of UE 115-d is a positional range of UE 115-d.

In some cases, determining the availability of the TA command may be performed when the UE 115 is in an idle mode with respect to the base station 105. In some cases, the message may be received when the UE 115 is in a connected mode with respect to the base station 105. In some cases, the uplink transmission may be an uplink signal or uplink channel transmitted on PUR based on a PUR configuration. In some cases, the uplink transmission may be a msgA transmission included a small data transmission, where the msgA transmission may be associated with a 2-step random access procedure, and where the msgA transmission is transmitted using PUR when the TA command is available. In some cases, the UE 115 may avoid transmitting the uplink transmission in an absence of the TA command and prepare a msg3 transmission including a small data transmission in connection with a four-step random access procedure, and transmit the msg3 transmission to a target base station 105 based on a timing determined from the four-step random access procedure.

At 520, UE 115-*d* may apply the TA command to an uplink transmission whose sending is based on the UE having a valid TA command and transmit the uplink transmission. In some cases, UE 115-*d* may apply the TA command to the uplink transmission whose sending is based on the availability of the TA command. In some cases, the uplink transmission is a PUR transmission. In some cases, the uplink transmission is a msgA associated with a 2-step RACH procedure.

Figure 6:
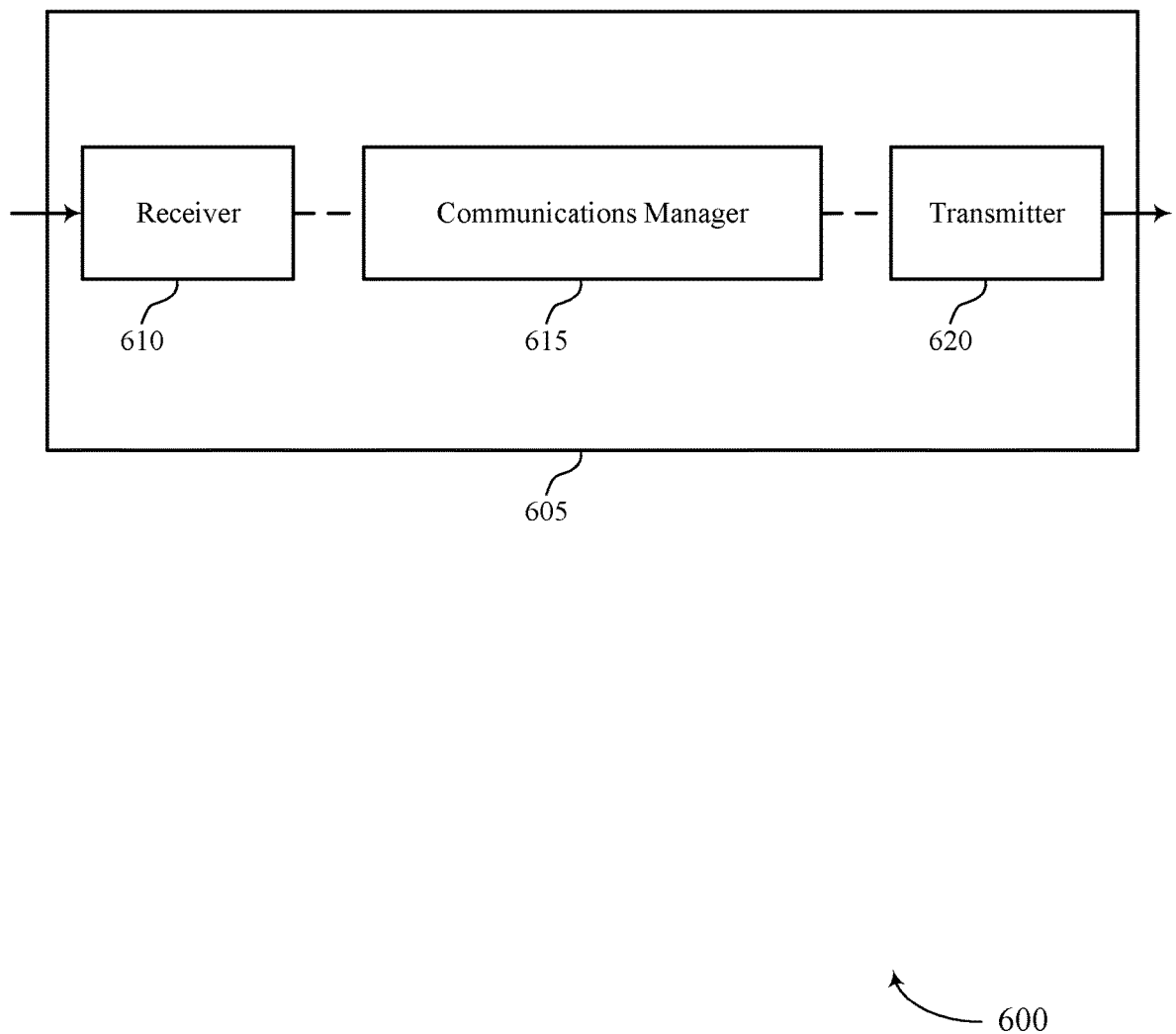
FIGS. 6 and 7 show block diagrams of devices that support TA command implementations for PUR transmissions in accordance with aspects of the present disclosure.

FIG. 6 shows a block diagram 600 of a device 605 that supports TA command implementations for PUR transmissions in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to TA command implementations for PUR transmissions, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may receive, from a base station, a message that includes one or more parameters for determination of a TA command from a set of TA commands, determine the TA command based on the one or more parameters and a current condition of the UE, and apply the TA command to an uplink transmission whose sending is based on the UE having a valid TA command. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

The communications manager 615 as described herein may be implemented to realize one or more potential advantages. One implementation may allow the device 605 to more efficiently transmit uplink transmissions to a base station while the device 605 is in an idle mode. For example, the device 605 may receive multiple TA commands and associated conditions that may be used to determine a valid TA command so the device 605 may transmit an uplink transmission in an idle mode using PUR.

Based on implementing the TA command techniques as described herein, a processor of a UE 115 (e.g., controlling the receiver 610, the transmitter 620, or the transceiver 920 as described with reference to FIG. 9) may mitigate power consumption and transmission delay associated with uplink data transmissions transmitted by a UE 115 in idle mode.

Figure 7:
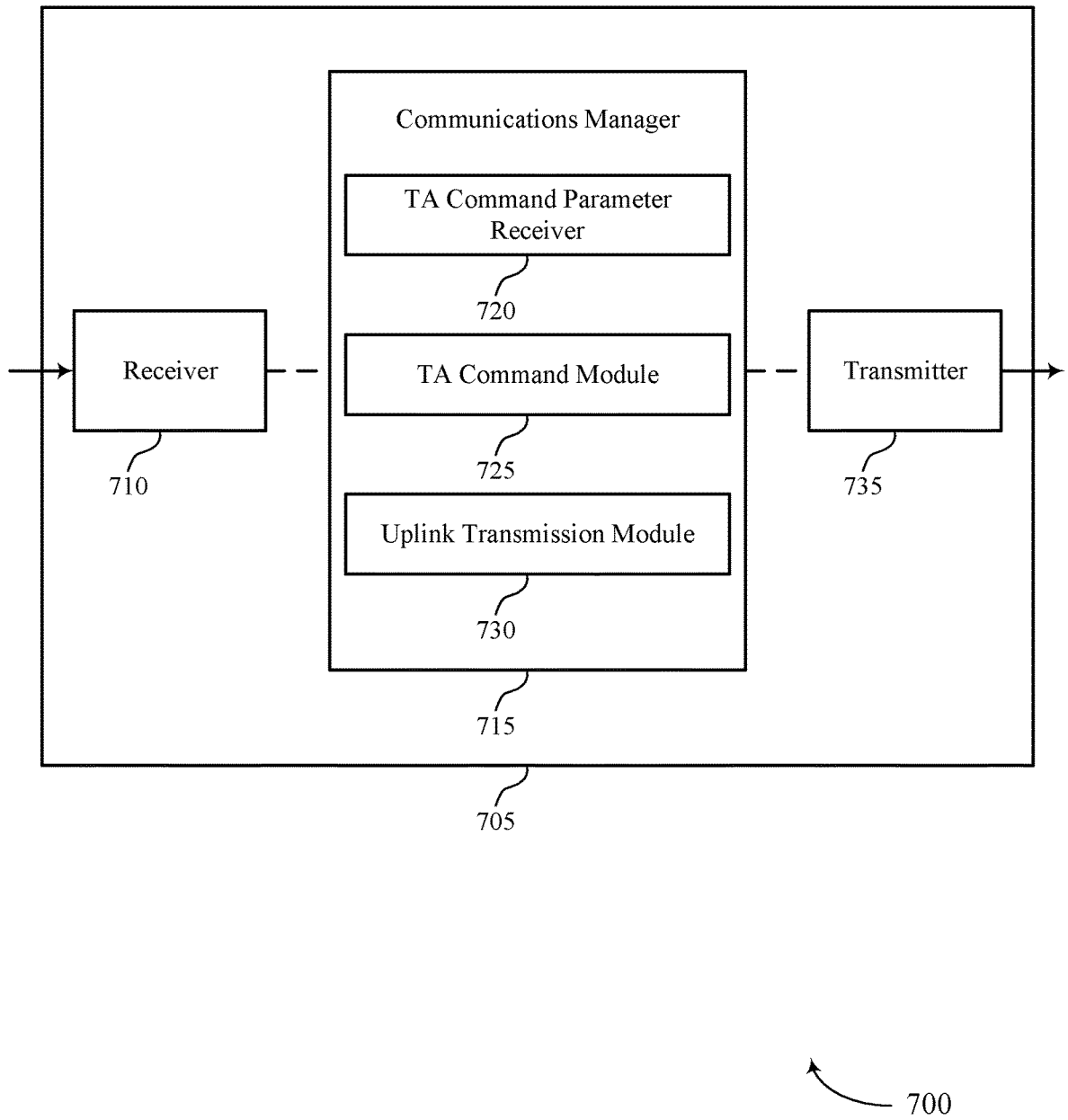

FIG. 7 shows a block diagram 700 of a device 705 that supports TA command implementations for PUR transmissions in accordance with aspects of the present disclosure. The device 705 may be an example of aspects of a device 605, or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to TA command implementations for PUR transmissions, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a TA command parameter receiver 720, a TA command module 725, and an uplink transmission module 730. The communications manager 715 may be an example of aspects of the communications manager 910 described herein.

The TA command parameter receiver 720 may receive, from a base station, a message that includes one or more parameters for determination of a TA command from a set of TA commands. The TA command module 725 may determine the TA command based on the one or more parameters and a current condition of the UE. The uplink transmission module 730 may apply the TA command to an uplink transmission whose sending is based on the UE having a valid TA command.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
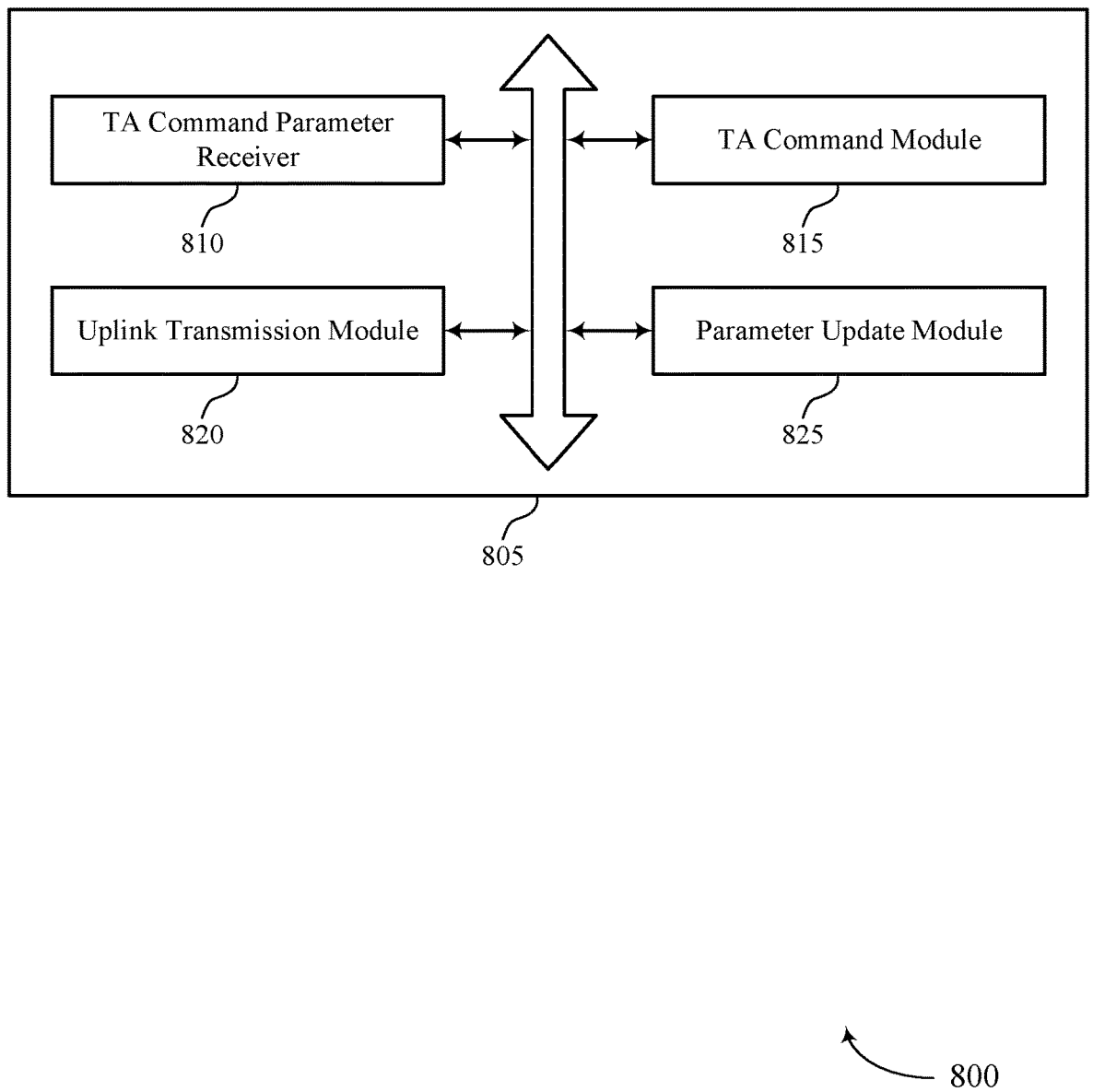
FIG. 8 shows a block diagram of a communications manager that supports TA command implementations for PUR transmissions in accordance with aspects of the present disclosure.

FIG. 8 shows a block diagram 800 of a communications manager 805 that supports TA command implementations for PUR transmissions in accordance with aspects of the present disclosure. The communications manager 805 may be an example of aspects of a communications manager 615, a communications manager 715, or a communications manager 910 described herein. The communications manager 805 may include a TA command parameter receiver 810, a TA command module 815, an uplink transmission module 820, and a parameter update module 825. Each of these modules may communicate, directly or indirectly, with one another (e.g., via one or more buses).

The TA command parameter receiver 810 may receive, from a base station, a message that includes one or more parameters for determination of a TA command from a set of TA commands. In some examples, the TA command parameter receiver 810 may receive a set of sets of parameters, each set of parameters including a set of conditions pertaining to a corresponding TA command of the set of TA commands. In some examples, the TA command parameter receiver 810 may receive a neural network model for determination of the TA command, where the one or more parameters are neural network model parameters. In some examples, the TA command parameter receiver 810 may receive a new set of parameters for determination of the TA command, the new set of parameters based on the parameter update. In some cases, the parameter update is included in the uplink transmission. In some cases, the parameter update includes an update regarding a neural network model.

The TA command module 815 may determine the TA command based on the one or more parameters and a current condition of the UE. In some examples, comparing the current condition of the UE with one or more of the sets of conditions, where each set of conditions includes a first RSRP range associated with a serving base station, a second RSRP range associated with one or more neighboring base stations, or a combination thereof. In some examples, the TA command module 815 may select the TA command based on the set of conditions that includes the current condition of the UE. In some examples, comparing the current condition of the UE with one or more of the sets of conditions, where each set of conditions includes a relative delay range between a serving base station and one or more neighboring base stations. In some examples, comparing the current condition of the UE with one or more of the sets of conditions, where each set of conditions includes a positional range of the UE.

In some examples, the TA command module 815 may use the current condition of the UE as an input to the neural network model. In some examples, the TA command module 815 may determine the TA command based on an output of the neural network model. In some examples, the TA command module 815 may determine the TA command while the UE is not in an active connected mode. In some cases, the current condition of the UE is a RSRP range associated with a serving base station, a second RSRP range associated with one or more neighboring base stations, or a combination thereof. In some cases, the current condition of the UE is a relative delay range between a serving base station and one or more neighboring base stations. In some cases, the current condition of the UE is a positional range of the UE.

In some cases, determining the TA command may include determining an availability of the TA command to be applied to the uplink transmission based on the current condition of the UE. In some cases, determining the availability of the TA command may be performed when the UE is in an idle mode with respect to the base station, and where the message may be received when the UE is in a connected mode with respect to the base station. In some cases, the uplink transmission may be an uplink signal or uplink channel transmitted on PUR based on a PUR configuration. In some cases, the uplink transmission may be a msgA transmission including a small data transmission, where the msgA transmission may be associated with a 2-step random access procedure, and where the msgA transmission may be transmitted using PUR when the TA command is available. In some cases, the TA command module 815 may prepare a msg3 transmission including a small data transmission in connection with a four-step random access procedure, and transmit the msg3 transmission to a target base station based on a timing determined from the four-step random access procedure.

The uplink transmission module 820 may apply the TA command to an uplink transmission whose sending is based on the UE having a valid TA command. In some cases, the uplink transmission is a PUR transmission. In some cases, the uplink transmission is a msgA transmission including a small data transmission transmitting using PUR, and where associated with a 2-step random access procedure. The parameter update module 825 may transmit a parameter update to the base station.

Figure 9:
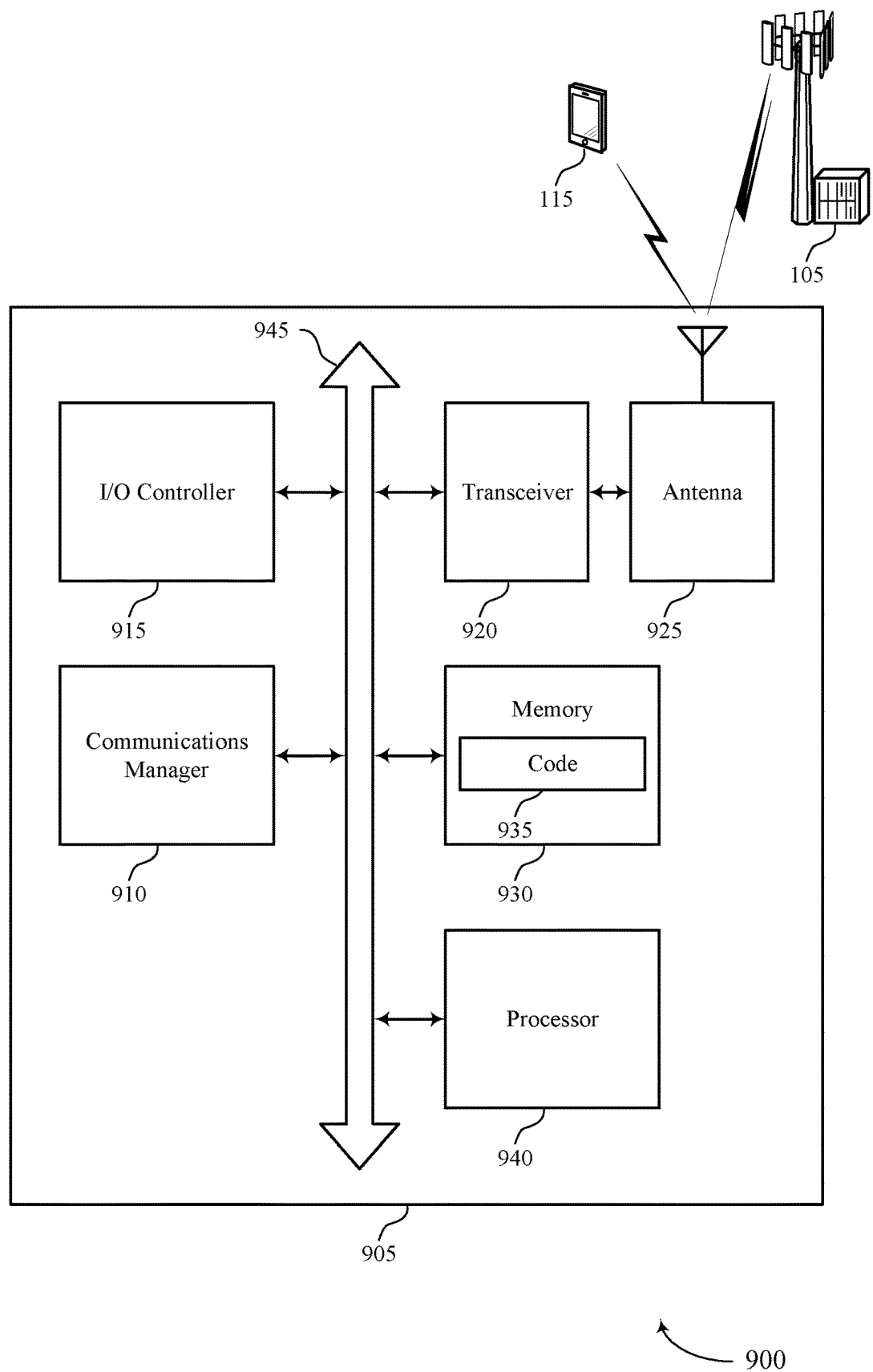
FIG. 9 shows a diagram of a system including a device that supports TA command implementations for PUR transmissions in accordance with aspects of the present disclosure.

FIG. 9 shows a diagram of a system 900 including a device 905 that supports TA command implementations for PUR transmissions in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive, from a base station, a message that includes one or more parameters for determination of a TA command from a set of TA commands, determine the TA command based on the one or more parameters and a current condition of the UE, and apply the TA command to an uplink transmission whose sending is based on the UE having a valid TA command.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting TA command implementations for PUR transmissions).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
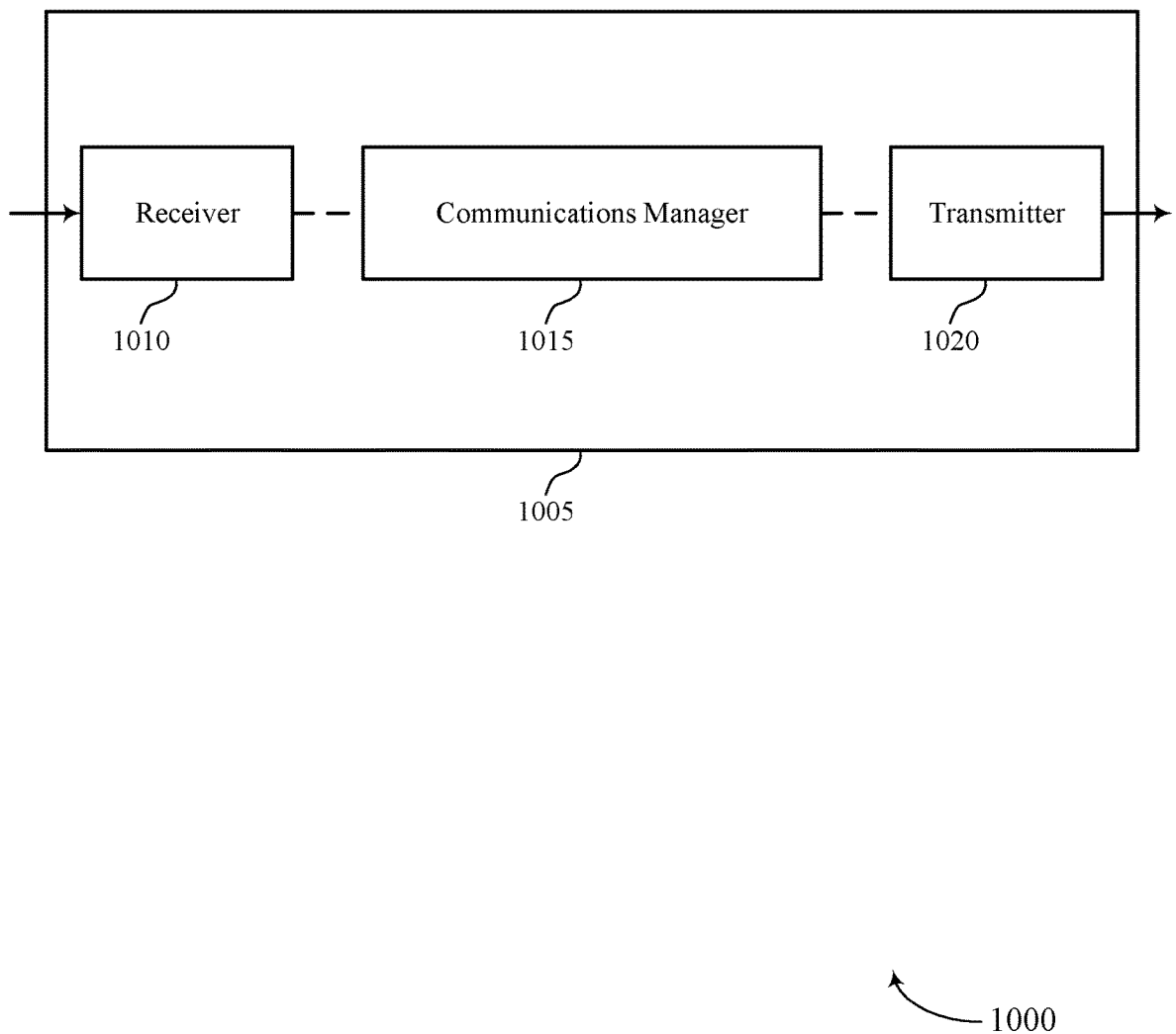
FIGS. 10 and 11 show block diagrams of devices that support TA command implementations for PUR transmissions in accordance with aspects of the present disclosure.

FIG. 10 shows a block diagram 1000 of a device 1005 that supports TA command implementations for PUR transmissions in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to TA command implementations for PUR transmissions, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may configure one or more parameters associated with a set of TA commands and transmit, to a UE, a message that includes the one or more parameters for determination of a TA command from the set of TA commands. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
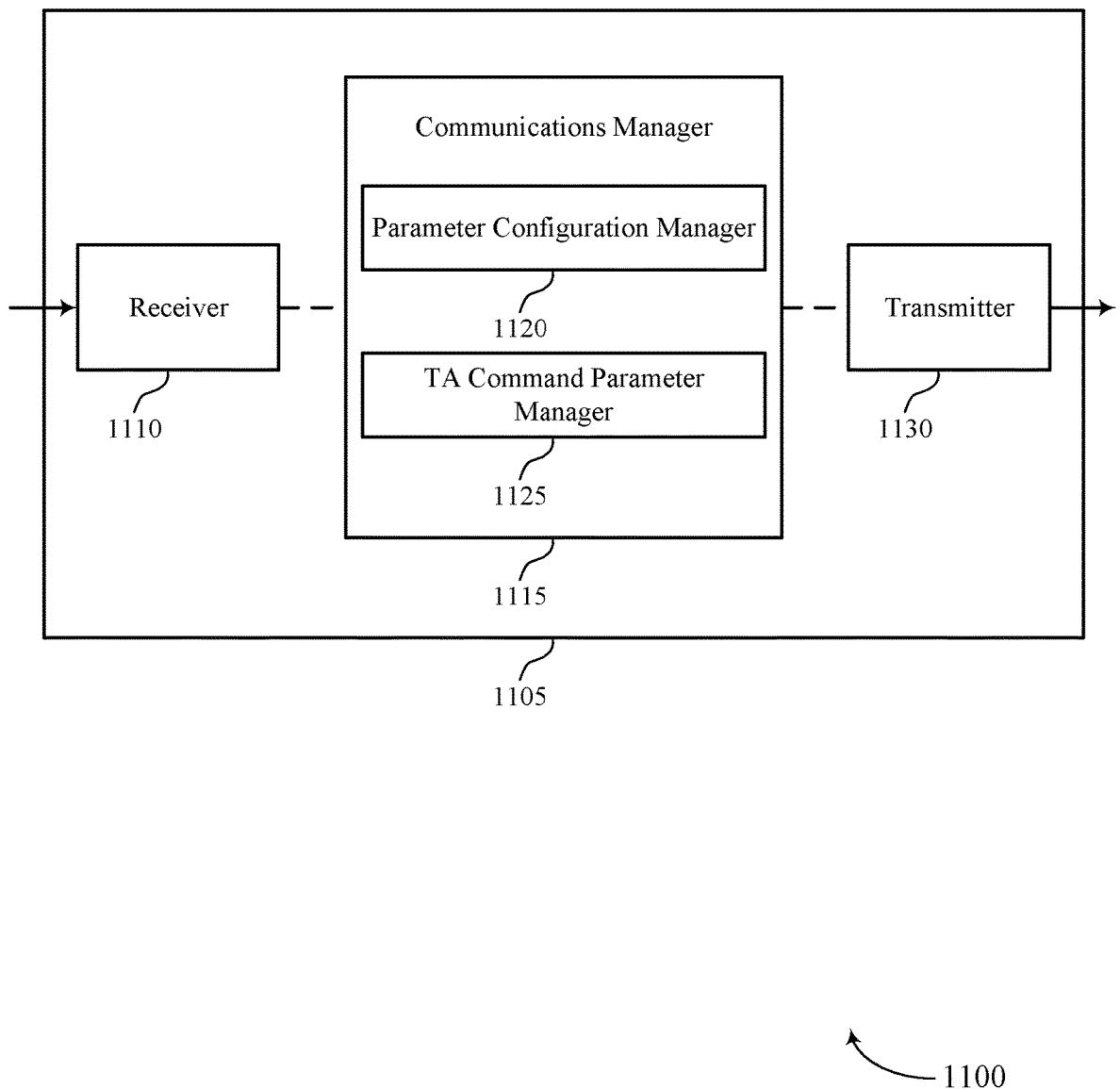

FIG. 11 shows a block diagram 1100 of a device 1105 that supports TA command implementations for PUR transmissions in accordance with aspects of the present disclosure. The device 1105 may be an example of aspects of a device 1005, or a base station 105 as described herein. The device 1105 may include a receiver 1110, a communications manager 1115, and a transmitter 1130. The device 1105 may also include a processor. Each of these components may be in communication with one another (e.g., via one or more buses).

The receiver 1110 may receive information such as packets, user data, or control information associated with various information channels (e.g., control channels, data channels, and information related to TA command implementations for PUR transmissions, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a parameter configuration manager 1120 and a TA command parameter manager 1125. The communications manager 1115 may be an example of aspects of the communications manager 1310 described herein.

The parameter configuration manager 1120 may configure one or more parameters associated with a set of TA commands. The TA command parameter manager 1125 may transmit, to a UE, a message that includes the one or more parameters for determination of a TA command from the set of TA commands.

The transmitter 1130 may transmit signals generated by other components of the device 1105. In some examples, the transmitter 1130 may be collocated with a receiver 1110 in a transceiver module. For example, the transmitter 1130 may be an example of aspects of the transceiver 1320 described with reference to FIG. 13. The transmitter 1130 may utilize a single antenna or a set of antennas.

Figure 12:
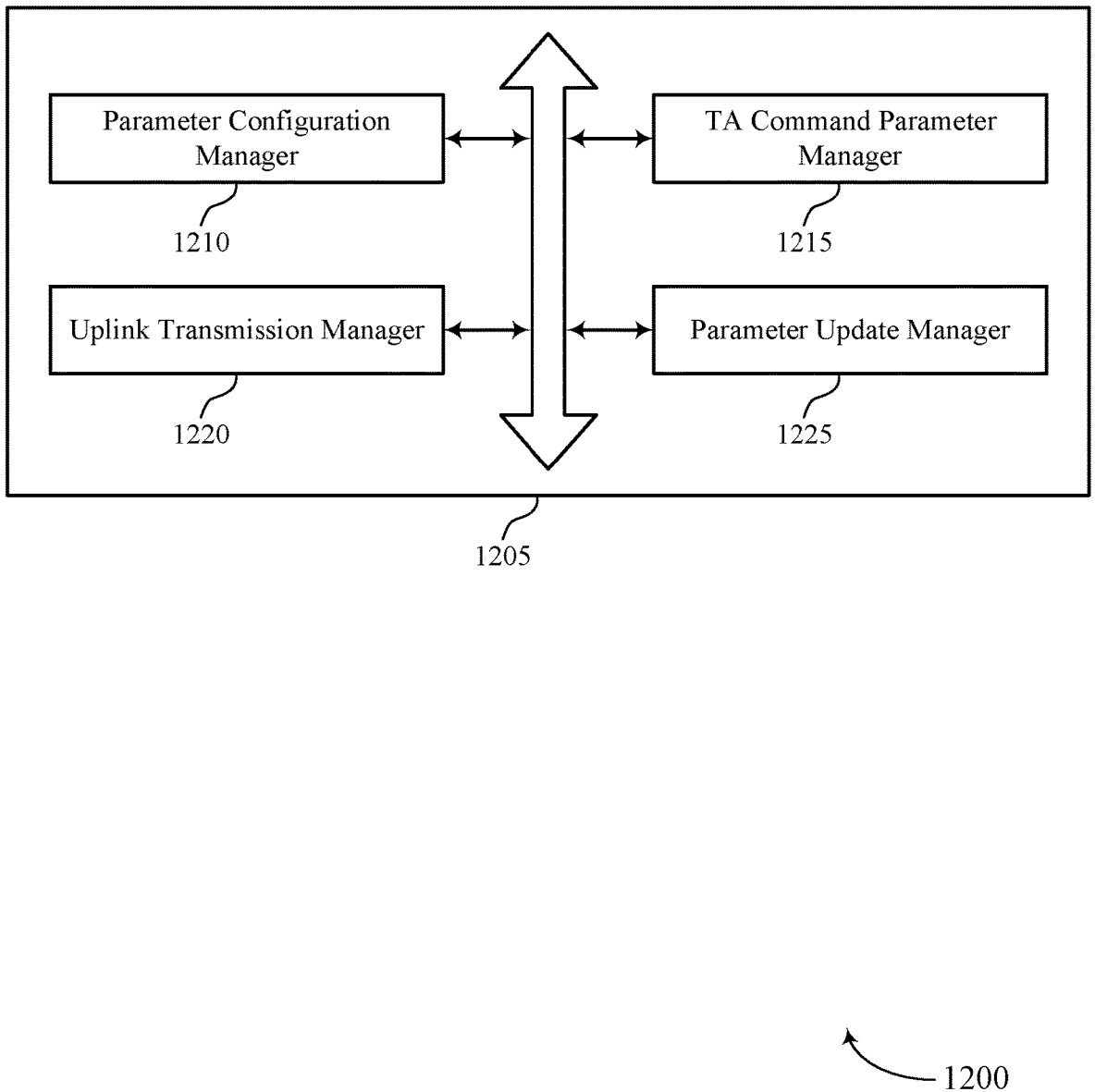
FIG. 12 shows a block diagram of a communications manager that supports TA command implementations for PUR transmissions in accordance with aspects of the present disclosure.

FIG. 12 shows a block diagram 1200 of a communications manager 1205 that supports TA command implementations for PUR transmissions in accordance with aspects of the present disclosure. The communications manager 1205 may be an example of aspects of a communications manager 1015, a communications manager 1115, or a communications manager 1310 described herein. The communications manager 1205 may include a parameter configuration manager 1210, a TA command parameter manager 1215, an uplink transmission manager 1220, and a parameter update manager 1225. Each of these modules may communicate, directly or indirectly, with one another (e.g., via one or more buses).

The parameter configuration manager 1210 may configure one or more parameters associated with a set of TA commands. In some examples, the parameter configuration manager 1210 may determine a new set of parameters based on the parameter update.

The TA command parameter manager 1215 may transmit, to a UE, a message that includes the one or more parameters for determination of a TA command from the set of TA commands. In some examples, the TA command parameter manager 1215 may transmit a set of sets of parameters, each set of parameters including a set of conditions pertaining to a corresponding TA command of the set of TA commands. In some examples, the TA command parameter manager 1215 may transmit a neural network model for determination of the TA command, where the one or more parameters are neural network model parameters. In some examples, the TA command parameter manager 1215 may transmit, to the UE, the new set of parameters for determination of the TA command.

In some cases, each set of conditions includes a first RSRP range associated with a serving base station, a second RSRP range associated with one or more neighboring base stations, or a combination thereof. In some cases, each set of conditions includes a relative delay range between a serving base station and one or more neighboring base stations. In some cases, each set of conditions includes a positional range of the UE.

The uplink transmission manager 1220 may receive an uplink transmission whose sending is based on the UE having a valid TA command, where the uplink transmission is a PUR transmission. The parameter update manager 1225 may receive, from the UE, a parameter update. In some cases, the parameter update is included in an autonomously-scheduled uplink transmission. In some cases, the parameter update includes an update regarding a neural network model.

Figure 13:
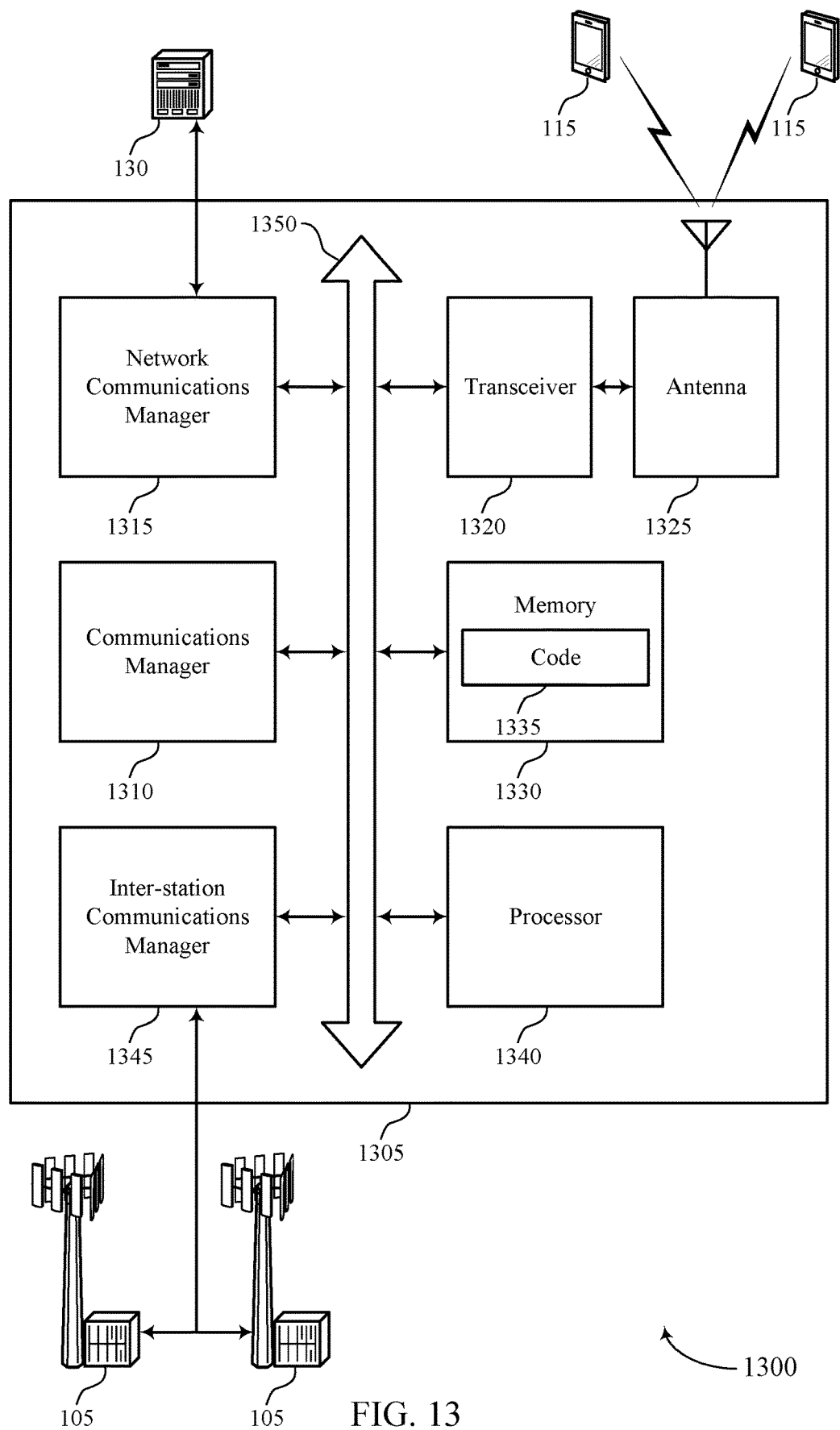
FIG. 13 shows a diagram of a system including a device that supports TA command implementations for PUR transmissions in accordance with aspects of the present disclosure.

FIG. 13 shows a diagram of a system 1300 including a device 1305 that supports TA command implementations for PUR transmissions in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may configure one or more parameters associated with a set of TA commands and transmit, to a UE, a message that includes the one or more parameters for determination of a TA command from the set of TA commands.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting TA command implementations for PUR transmissions).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
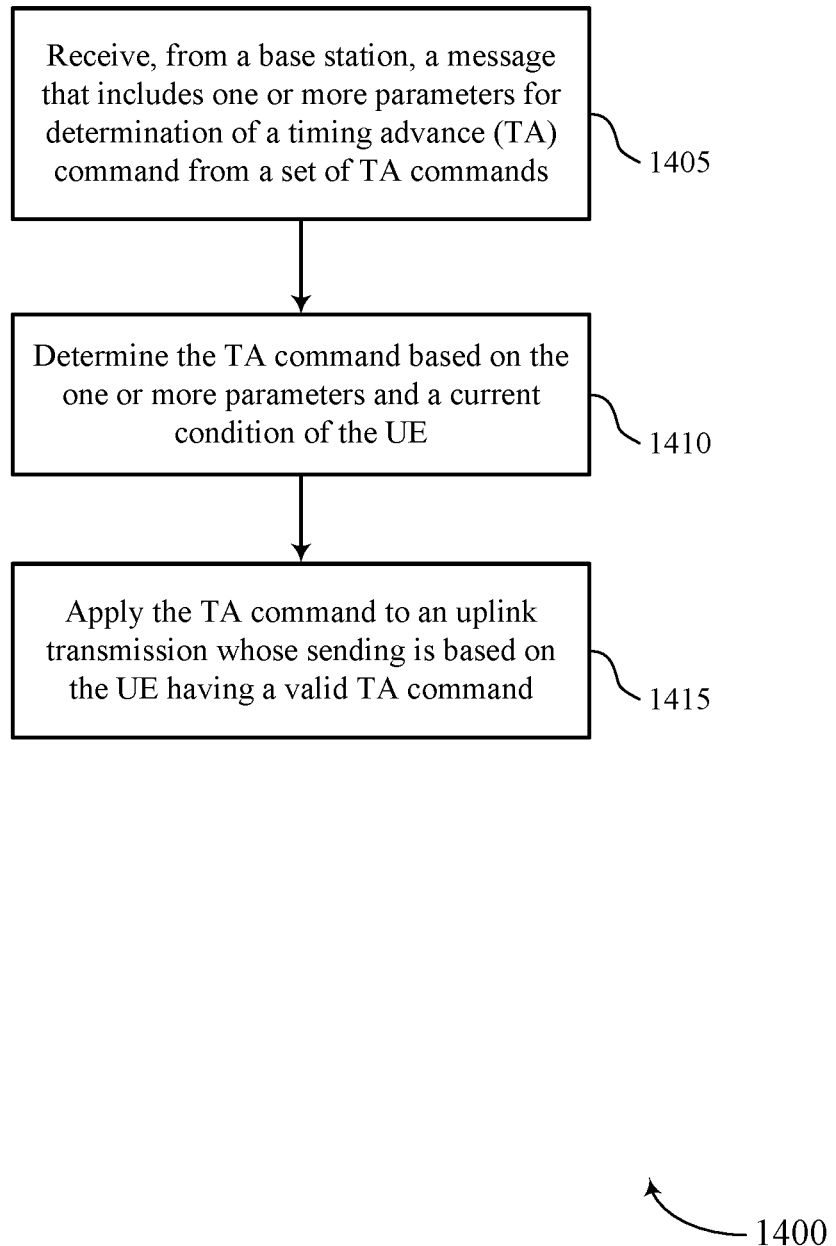
FIGS. 14 through 17 show flowcharts illustrating methods that support TA command implementations for PUR transmissions in accordance with aspects of the present disclosure.

FIG. 14 shows a flowchart illustrating a method 1400 that supports TA command implementations for PUR transmissions in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may receive, from a base station, a message that includes one or more parameters for determination of a TA command from a set of TA commands. The operations of 1405 may be performed according to the methods described herein. In some examples, aspects of the operations of 1405 may be performed by a TA command parameter receiver as described with reference to FIGS. 6 through 9.

At 1410, the UE may determine the TA command based on the one or more parameters and a current condition of the UE. The operations of 1410 may be performed according to the methods described herein. In some examples, aspects of the operations of 1410 may be performed by a TA command module as described with reference to FIGS. 6 through 9.

At 1415, the UE may apply the TA command to an uplink transmission whose sending is based on the UE having a valid TA command. The operations of 1415 may be performed according to the methods described herein. In some examples, aspects of the operations of 1415 may be performed by an uplink transmission module as described with reference to FIGS. 6 through 9.

Figure 15:
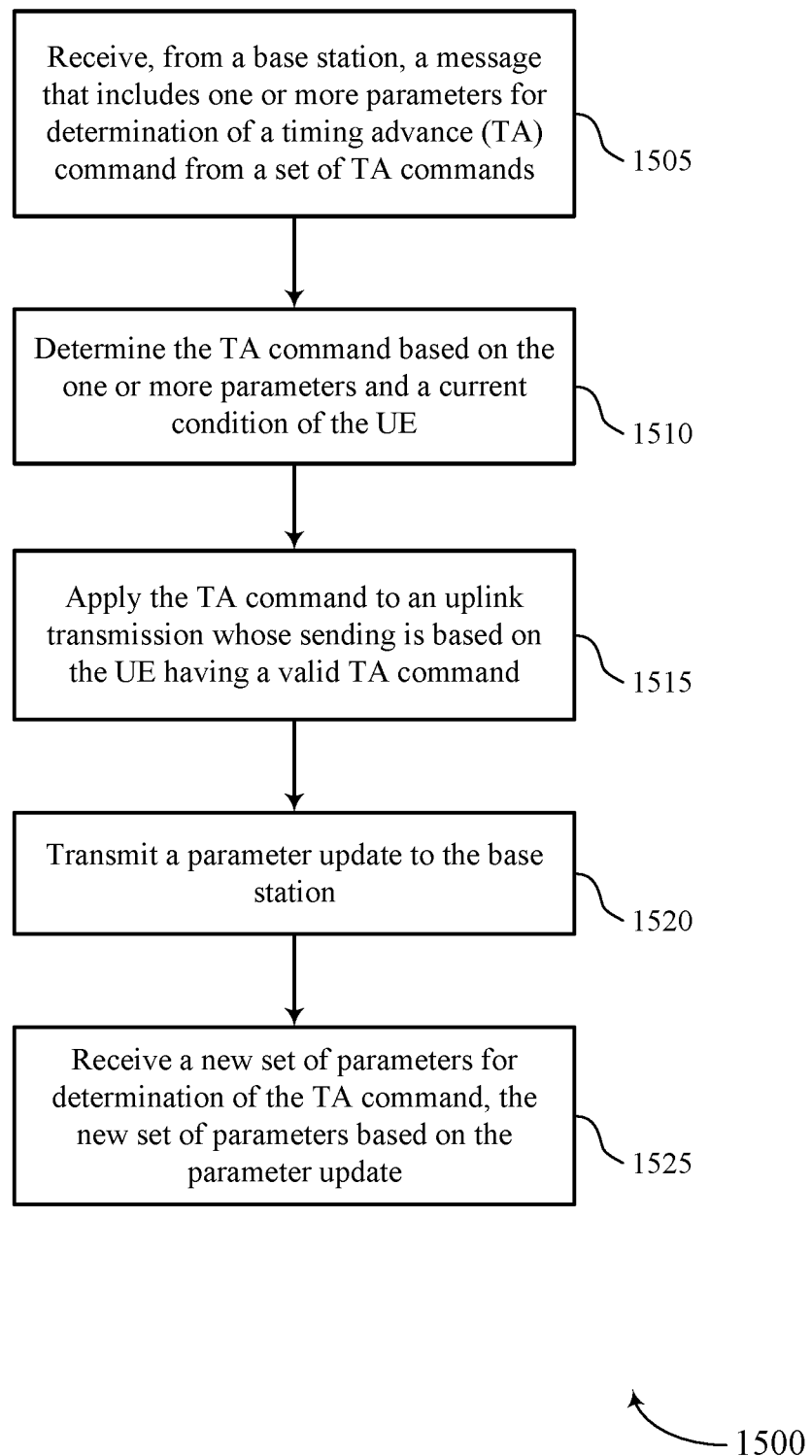

FIG. 15 shows a flowchart illustrating a method 1500 that supports TA command implementations for PUR transmissions in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may receive, from a base station, a message that includes one or more parameters for determination of a TA command from a set of TA commands. The operations of 1505 may be performed according to the methods described herein. In some examples, aspects of the operations of 1505 may be performed by a TA command parameter receiver as described with reference to FIGS. 6 through 9.

At 1510, the UE may determine the TA command based on the one or more parameters and a current condition of the UE. The operations of 1510 may be performed according to the methods described herein. In some examples, aspects of the operations of 1510 may be performed by a TA command module as described with reference to FIGS. 6 through 9.

At 1515, the UE may apply the TA command to an uplink transmission whose sending is based on the UE having a valid TA command. The operations of 1515 may be performed according to the methods described herein. In some examples, aspects of the operations of 1515 may be performed by an uplink transmission module as described with reference to FIGS. 6 through 9.

At 1520, the UE may transmit a parameter update to the base station. The operations of 1520 may be performed according to the methods described herein. In some examples, aspects of the operations of 1520 may be performed by a parameter update module as described with reference to FIGS. 6 through 9.

At 1525, the UE may receive a new set of parameters for determination of the TA command, the new set of parameters based on the parameter update. The operations of 1525 may be performed according to the methods described herein. In some examples, aspects of the operations of 1525 may be performed by a TA command parameter receiver as described with reference to FIGS. 6 through 9.

Figure 16:
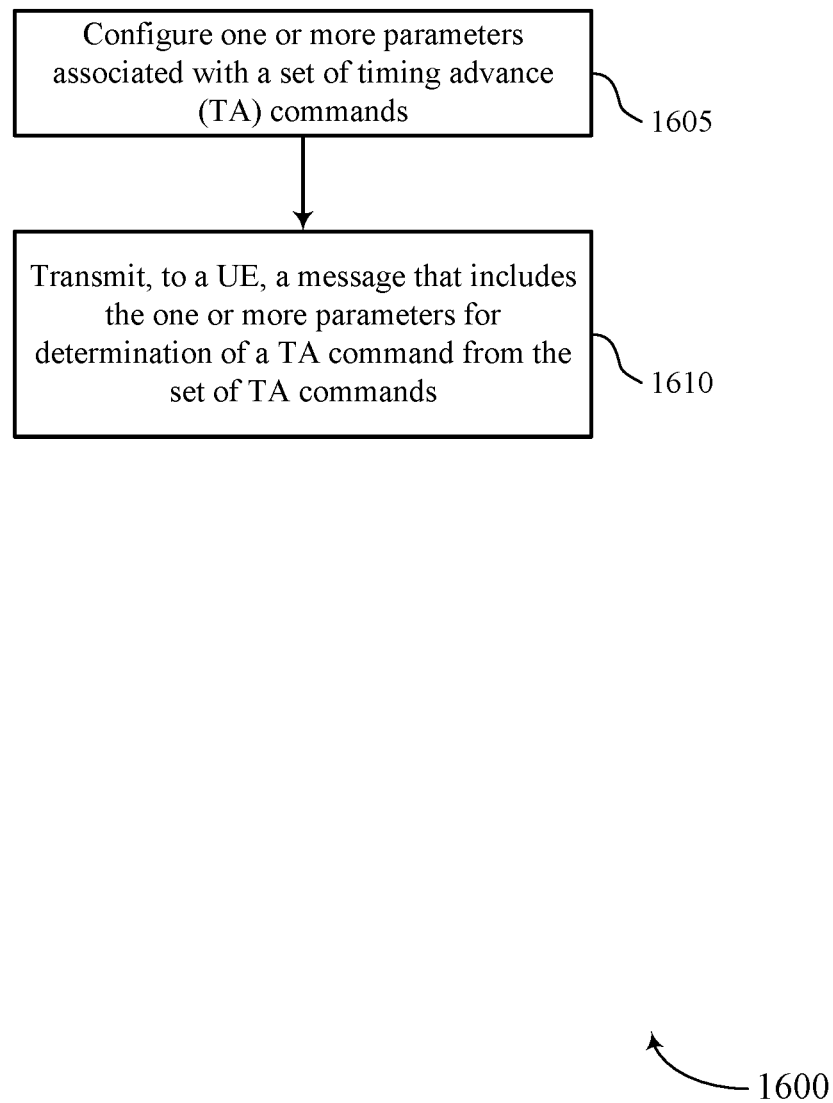

FIG. 16 shows a flowchart illustrating a method 1600 that supports TA command implementations for PUR transmissions in accordance with aspects of the present disclosure. The operations of method 1600 may be implemented by a base station 105 or its components as described herein. For example, the operations of method 1600 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1605, the base station may configure one or more parameters associated with a set of TA commands. The operations of 1605 may be performed according to the methods described herein. In some examples, aspects of the operations of 1605 may be performed by a parameter configuration manager as described with reference to FIGS. 10 through 13.

At 1610, the base station may transmit, to a UE, a message that includes the one or more parameters for determination of a TA command from the set of TA commands. The operations of 1610 may be performed according to the methods described herein. In some examples, aspects of the operations of 1610 may be performed by a TA command parameter manager as described with reference to FIGS. 10 through 13.

Figure 17:
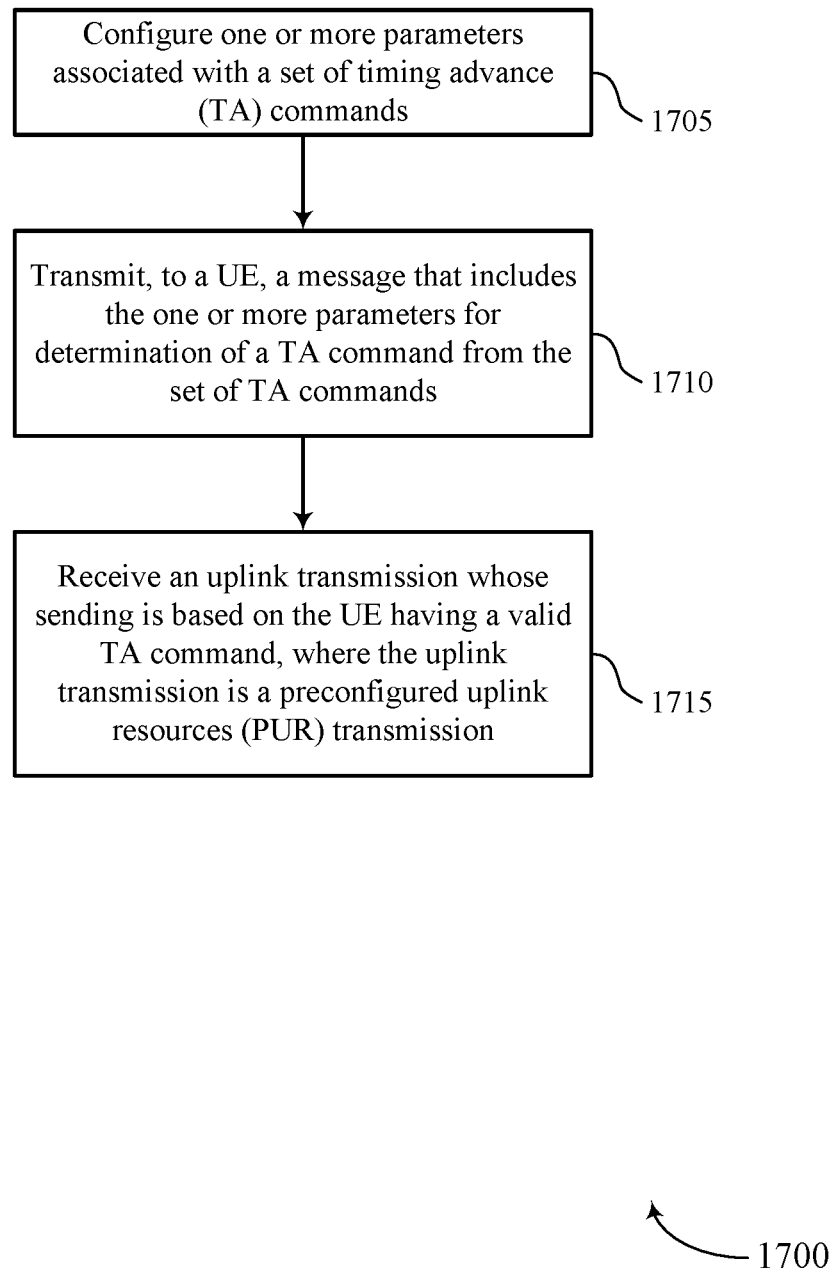

FIG. 17 shows a flowchart illustrating a method 1700 that supports TA command implementations for PUR transmissions in accordance with aspects of the present disclosure. The operations of method 1700 may be implemented by a base station 105 or its components as described herein. For example, the operations of method 1700 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1705, the base station may configure one or more parameters associated with a set of TA commands. The operations of 1705 may be performed according to the methods described herein. In some examples, aspects of the operations of 1705 may be performed by a parameter configuration manager as described with reference to FIGS. 10 through 13.

At 1710, the base station may transmit, to a UE, a message that includes the one or more parameters for determination of a TA command from the set of TA commands. The operations of 1710 may be performed according to the methods described herein. In some examples, aspects of the operations of 1710 may be performed by a TA command parameter manager as described with reference to FIGS. 10 through 13.

At 1715, the base station may receive an uplink transmission whose sending is based on the UE having a valid TA command, where the uplink transmission is a PUR transmission. The operations of 1715 may be performed according to the methods described herein. In some examples, aspects of the operations of 1715 may be performed by an uplink transmission manager as described with reference to FIGS. 10 through 13.

The following provides an overview of aspects of the present disclosure:

Aspect 1: A method for wireless communications at a UE, comprising: receiving, from a base station, a message that includes one or more parameters for determination of a timing advance command from a plurality of timing advance commands; determining the timing advance command based at least in part on the one or more parameters and a current condition of the UE; and applying the timing advance command to an uplink transmission whose sending is based at least in part on the UE having a valid timing advance command.

Aspect 2: The method of aspect 1, wherein determining the timing advance command comprises determining an availability of the timing advance command to be applied to the uplink transmission based at least in part on the current condition of the UE.

Aspect 3: The method of aspect 2, wherein determining the availability of the timing advance command is performed when the UE is in an idle or inactive mode with respect to the base station, and the message is received when the UE is in a connected mode with respect to the base station.

Aspect 4: The method of any of aspects 2 through 3, wherein the uplink transmission is an uplink signal or uplink channel transmitted on preconfigured uplink resources (PUR) based on a PUR configuration.

Aspect 5: The method of any of aspects 2 through 4, wherein the uplink transmission is a msgA transmission comprising a small data transmission, the msgA transmission is associated with a 2-step random access procedure, and the msgA transmission is transmitted using preconfigured uplink resources (PUR) when the timing advance command is available.

Aspect 6: The method of any of aspects 2 through 5, wherein the UE avoids transmitting the uplink transmission in an absence of the timing advance command, the method further comprising: preparing a msg3 transmission comprising a small data transmission in connection with a four-step random access procedure; and transmitting the msg3 transmission to a target base station based at least in part on a timing determined from the four-step random access procedure.

Aspect 7: The method of any of aspects 1 through 6, wherein receiving the message that includes the one or more parameters for determination of the timing advance command comprises: receiving a plurality of sets of parameters, each set of parameters including a set of conditions pertaining to a corresponding timing advance command of the plurality of timing advance commands.

Aspect 8: The method of aspect 7, wherein determining the timing advance command further comprises: comparing the current condition of the UE with one or more of the sets of conditions, wherein each set of conditions comprises a first reference signal received power range associated with a serving base station, a second reference signal received power range associated with one or more neighboring base stations, or a combination thereof; and selecting the timing advance command based at least in part on the set of conditions that includes the current condition of the UE.

Aspect 9: The method of any of aspects 7 or 8, wherein determining the timing advance command further comprises: comparing the current condition of the UE with one or more of the sets of conditions, wherein each set of conditions comprises a relative delay range between a serving base station and one or more neighboring base stations; and selecting the timing advance command based at least in part on the set of conditions that includes the current condition of the UE.

Aspect 10: The method of any of aspects 7 through 9, wherein determining the timing advance command further comprises: comparing the current condition of the UE with one or more of the sets of conditions, wherein each set of conditions comprises a positional range of the UE; and selecting the timing advance command based at least in part on the set of conditions that includes the current condition of the UE.

Aspect 11: The method of any of aspects 1 through 10, wherein receiving the message that includes the one or more parameters for determination of the timing advance command comprises: receiving a neural network model for determination of the timing advance command, wherein the one or more parameters are neural network model parameters.

Aspect 12: The method of aspect 11, wherein determining the timing advance command further comprises: using the current condition of the UE as an input to the neural network model; and determining the timing advance command based at least in part on an output of the neural network model.

Aspect 13: The method of aspect 12, wherein the current condition of the UE is a reference signal received power range associated with a serving base station, a second reference signal received power range associated with one or more neighboring base stations, or a combination thereof.

Aspect 14: The method of any of aspects 12 or 13, wherein the current condition of the UE is a relative delay range between a serving base station and one or more neighboring base stations.

Aspect 15: The method of any of aspects 12 through 14, wherein the current condition of the UE is a positional range of the UE.

Aspect 16: The method of any of aspects 1 through 15, wherein the uplink transmission is a preconfigured uplink resources (PUR) transmission.

Aspect 17: The method of any of aspects 1 through 16, wherein the uplink transmission is a msgA transmission comprising a small data transmission transmitted using preconfigured uplink resources, and the msgA is associated with a 2-step random access procedure.

Aspect 18: The method of any of aspects 1 through 17, wherein determining the timing advance command comprises: determining the timing advance command while the UE is not in an active connected mode.

Aspect 19: The method of any of aspects 1 through 18, further comprising: transmitting a parameter update to the base station; and receiving a new set of parameters for determination of the timing advance command, the new set of parameters based at least in part on the parameter update.

Aspect 20: The method of aspect 19, wherein the parameter update is included in the uplink transmission.

Aspect 21: The method of any of aspects 19 or 20, wherein the parameter update comprises an update regarding a neural network model.

Aspect 22: A method for wireless communications at a base station, comprising: configuring one or more parameters associated with a plurality of timing advance commands; and transmitting, to a UE, a message that includes the one or more parameters for determination of a timing advance command from the plurality of timing advance commands.

Aspect 23: The method of aspect 22, wherein transmitting the message that includes one or more parameters for determination of the timing advance command comprises: transmitting a plurality of sets of parameters, each set of parameters including a set of conditions pertaining to a corresponding timing advance command of the plurality of timing advance commands.

Aspect 24: The method of aspect 23, wherein each set of conditions comprises a first reference signal received power range associated with a serving base station, a second reference signal received power range associated with one or more neighboring base stations, or a combination thereof.

Aspect 25: The method of any of aspects 23 through 24, wherein each set of conditions comprises a relative delay range between a serving base station and one or more neighboring base stations.

Aspect 26: The method of any of aspects 23 through 25, wherein each set of conditions comprises a positional range of the UE.

Aspect 27: The method of any of aspects 22 through 26, wherein transmitting the message that includes one or more parameters for determination of the timing advance command further comprises: transmitting a neural network model for determination of the timing advance command, wherein the one or more parameters are neural network model parameters.

Aspect 28: The method of any of aspects 22 through 27, further comprising: receiving an uplink transmission whose sending is based at least in part on the UE having a valid timing advance command, wherein the uplink transmission is a preconfigured uplink resources (PUR) transmission.

Aspect 29: The method of any of aspects 22 through 28, further comprising: receiving, from the UE, a parameter update; determining a new set of parameters based at least in part on the parameter update; and transmitting, to the UE, the new set of parameters for determination of the timing advance command.

Aspect 30: The method of aspect 29, wherein the parameter update is included in an autonomously-scheduled uplink transmission.

Aspect 31: The method of any of aspects 29 or 30, wherein the parameter update comprises an update regarding a neural network model.

Aspect 32: An apparatus for wireless communications at a UE, comprising a processor; memory coupled with the processor; and instructions stored in the memory and executable by the processor to cause the apparatus to perform a method of any of aspects 1 through 21.

Aspect 33: An apparatus for wireless communications at a UE, comprising at least one means for performing a method of any of aspects 1 through 21.

Aspect 34: A non-transitory computer-readable medium storing code for wireless communications at a UE, the code comprising instructions executable by a processor to perform a method of any of aspects 1 through 21.

Aspect 35: An apparatus for wireless communications at a base station, comprising a processor; memory coupled with the processor; and instructions stored in the memory and executable by the processor to cause the apparatus to perform a method of any of aspects 22 through 31.

Aspect 36: An apparatus for wireless communications at a base station, comprising at least one means for performing a method of any of aspects 22 through 31.

Aspect 37: A non-transitory computer-readable medium storing code for wireless communications at a base station, the code comprising instructions executable by a processor to perform a method of any of aspects 22 through 31.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   receiving, from a network device, one or more neural network model parameters associated with a neural network model for determination of a timing advance command;
   inputting a current condition of the UE into the neural network model; and
   applying the timing advance command to an uplink transmission whose sending is based at least in part on the UE having a valid timing advance command, wherein the timing advance command is output by the neural network model based at least in part on the current condition of the UE and the one or more neural network model parameters.

2. The method of claim 1, further comprising:
   determining an availability of the timing advance command to be applied to the uplink transmission based at least in part on the current condition of the UE.

3. The method of claim 2, wherein determining the availability of the timing advance command is performed when the UE is in an idle or inactive mode with respect to the network device, and wherein a message is received when the UE is in a connected mode with respect to the network device.

4. The method of claim 2, wherein the uplink transmission is an uplink signal or uplink channel transmitted on preconfigured uplink resources (PUR) based on a PUR configuration.

5. The method of claim 2, wherein the uplink transmission is a msgA transmission comprising a small data transmission, wherein the msgA transmission is associated with a 2-step random access procedure, and wherein the msgA transmission is transmitted using preconfigured uplink resources (PUR) when the timing advance command is available.

6. The method of claim 2, wherein the UE avoids transmitting the uplink transmission in an absence of the timing advance command, the method further comprising:
   preparing a msg3 transmission comprising a small data transmission in connection with a four-step random access procedure; and
   transmitting the msg3 transmission to a target base station based at least in part on a timing determined from the four-step random access procedure.

7. The method of claim 1, further comprising:
   receiving a plurality of sets of parameters, each set of parameters including a set of conditions pertaining to a corresponding timing advance command of a plurality of timing advance commands.

8. The method of claim 7, further comprising:
   comparing the current condition of the UE with one or more of the sets of conditions, wherein each set of conditions comprises a first reference signal received power range associated with a serving base station, a second reference signal received power range associated with one or more neighboring base stations, or a combination thereof; and
   selecting the timing advance command based at least in part on the set of conditions that includes the current condition of the UE.

9. The method of claim 7, further comprising:
   comparing the current condition of the UE with one or more of the sets of conditions, wherein each set of conditions comprises a relative delay range between a serving base station and one or more neighboring base stations; and selecting the timing advance command based at least in part on the set of conditions that includes the current condition of the UE.

10. The method of claim 7, further comprising:
comparing the current condition of the UE with one or more of the sets of conditions, wherein each set of conditions comprises a positional range of the UE; and
selecting the timing advance command based at least in part on the set of conditions that includes the current condition of the UE.

11. The method of claim 1, wherein the current condition of the UE is a reference signal received power range associated with a serving base station, a second reference signal received power range associated with one or more neighboring base stations, or a combination thereof.

12. The method of claim 1, wherein the current condition of the UE is a relative delay range between a serving base station and one or more neighboring base stations.

13. The method of claim 1, wherein the current condition of the UE is a positional range of the UE.

14. The method of claim 1, wherein the uplink transmission is a preconfigured uplink resources (PUR) transmission.

15. The method of claim 1, wherein the uplink transmission is a msgA transmission comprising a small data transmission transmitted using preconfigured uplink resources, and wherein the msgA transmission is associated with a 2-step random access procedure.

16. The method of claim 1, further comprising:
determining the timing advance command while the UE is not in an active connected mode.

17. The method of claim 1, further comprising:
transmitting a parameter update to the network device; and
receiving a new set of parameters for determination of the timing advance command, the new set of parameters based at least in part on the parameter update.

18. The method of claim 17, wherein the parameter update is included in the uplink transmission.

19. The method of claim 17, wherein the parameter update comprises an update regarding the neural network model.

20. A method for wireless communications at a network device, comprising:
configuring one or more parameters associated with a plurality of timing advance commands, wherein the one or more parameters are one or more neural network model parameters; and
transmitting, to a user equipment (UE), the one or more neural network model parameters associated with a neural network model for determination of a timing advance command from the plurality of timing advance commands.

21. The method of claim 20, further comprising:
transmitting a plurality of sets of parameters, each set of parameters including a set of conditions pertaining to a corresponding timing advance command of the plurality of timing advance commands.

22. The method of claim 21, wherein each set of conditions comprises a first reference signal received power range associated with a serving network device, a second reference signal received power range associated with one or more neighboring network devices, or a combination thereof.

23. The method of claim 21, wherein each set of conditions comprises a relative delay range between a serving network device and one or more neighboring network devices.

24. The method of claim 20, further comprising:
receiving an uplink transmission whose sending is based at least in part on the UE having a valid timing advance command, wherein the uplink transmission is a preconfigured uplink resources (PUR) transmission.

25. The method of claim 20, further comprising:
receiving, from the UE, a parameter update;
determining a new set of parameters based at least in part on the parameter update; and
transmitting, to the UE, the new set of parameters for determination of the timing advance command.

26. An apparatus for wireless communications at a user equipment (UE), comprising:
a processor,
memory coupled with the processor; and
instructions stored in the memory and executable by the processor to cause the apparatus to:
receive, from a base station, one or more neural network model parameters associated with a neural network model for determination of a timing advance command;
input a current condition of the UE into the neural network model; and
apply the timing advance command to an uplink transmission whose sending is based at least in part on the UE having a valid timing advance command, wherein the timing advance command is output by the neural network model based at least in part on the current condition of the UE and the one or more neural network model parameters.

27. An apparatus for wireless communications at a network device, comprising:
a processor,
memory coupled with the processor; and
instructions stored in the memory and executable by the processor to cause the apparatus to:
configure one or more parameters associated with a plurality of timing advance commands, wherein the one or more parameters are one or more neural network model parameters; and
transmit, to a user equipment (UE), the one or more neural network model parameters associated with a neural network model for determination of a timing advance command from the plurality of timing advance commands.

* * * * *